US010269144B2

(12) United States Patent
Modaikkal et al.

(10) Patent No.: US 10,269,144 B2
(45) Date of Patent: Apr. 23, 2019

(54) DITHER SPATIAL NOISE AWARE REDUNDANCY BYPASS

(71) Applicant: QUALCOMM Incorporated, San Diego, CA (US)

(72) Inventors: Sreekanth Modaikkal, Bangalore (IN); Anitha Madugiri Siddaraju, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/676,592

(22) Filed: Aug. 14, 2017

(65) Prior Publication Data

US 2019/0051020 A1 Feb. 14, 2019

(51) Int. Cl.

| | |
|---|---|
| ***G06T 7/90*** | (2017.01) |
| ***G06T 11/00*** | (2006.01) |
| ***G09G 5/06*** | (2006.01) |
| ***G09G 5/04*** | (2006.01) |
| ***G06T 7/73*** | (2017.01) |

(52) U.S. Cl.
CPC .............. *G06T 11/001* (2013.01); *G06T 7/73* (2017.01); *G06T 7/90* (2017.01); *G09G 5/04* (2013.01); *G09G 5/06* (2013.01)

(58) Field of Classification Search
CPC .......................... G06K 15/1876; G09G 3/2051
USPC .......................................................... 345/598
See application file for complete search history.

(56) References Cited

U.S. PATENT DOCUMENTS

| | | | | |
|---|---|---|---|---|
| 2005/0185001 | A1* | 8/2005 | Feng .................... | G09G 3/2055 345/597 |
| 2009/0154831 | A1 | 6/2009 | Lee et al. | |
| 2011/0135011 | A1 | 6/2011 | Eddy et al. | |
| 2015/0085921 | A1 | 3/2015 | Chou | |
| 2015/0092244 | A1 | 4/2015 | Yamada | |
| 2016/0173723 | A1* | 6/2016 | Kobayashi ........... | H04N 1/4052 358/3.03 |
| 2016/0379543 | A1 | 12/2016 | Furihata et al. | |
| 2018/0260658 | A1 | 9/2018 | Nawandhar et al. | |

* cited by examiner

*Primary Examiner* — Thomas J Lett
(74) *Attorney, Agent, or Firm* — Shumaker & Sieffert, P.A.

(57) ABSTRACT

This disclosure describes examples for generating image content based on both a color value and a dither value that is to be applied. When a color value for the current pixel is the same as the color value for a previous pixel, and a dither value that is to be applied to the current pixel is the same as the dither value that was added to the previous pixel, a display processor may output the output color value for the previous pixel as the output color value for the current pixel.

25 Claims, 13 Drawing Sheets

| | | | |
|---|---|---|---|
| 15 | 7 | 13 | 5 |
| 3 | 11 | 1 | 9 |
| 12 | 4 | 14 | 6 |
| 0 | 8 | 2 | 10 |

4X4 DITHER SPATIAL NOISE

FIG. 2

| | | | | | |
|---|---|---|---|---|---|
| 25 | 25 | 25 | 25 | 25 | 25 |
| 25 | 25 | 25 | 25 | 25 | 25 |
| 25 | 25 | 25 | 25 | 25 | 25 |
| 25 | 25 | 25 | 25 | 25 | 25 |

INPUT PIXELS X(x,y)

FIG. 3

| | | | | | |
|---|---|---|---|---|---|
| 15 | 7 | 13 | 5 | 15 | 7 |
| 3 | 11 | 1 | 9 | 3 | 11 |
| 12 | 4 | 14 | 6 | 12 | 4 |
| 0 | 8 | 2 | 10 | 0 | 8 |

NOISE VALUES N(x,y)

FIG. 4

| | | | | | |
|---|---|---|---|---|---|
| 20 | 16 | 19 | 15 | 20 | 16 |
| 14 | 18 | 13 | 17 | 14 | 18 |
| 19 | 15 | 20 | 16 | 19 | 15 |
| 13 | 17 | 14 | 18 | 13 | 17 |

DESIRED VALUES Y(x,y)

FIG. 5

| | | | | | |
|---|---|---|---|---|---|
| M | H | H | H | H | H |
| H | H | H | H | H | H |
| H | H | H | H | H | H |
| H | H | H | H | H | H |

CACHE HIT FOR EXISTING BYPASS

FIG. 6

| | | | | | |
|---|---|---|---|---|---|
| 20 | 20 | 20 | 20 | 20 | 20 |
| 20 | 20 | 20 | 20 | 20 | 20 |
| 20 | 20 | 20 | 20 | 20 | 20 |
| 20 | 20 | 20 | 20 | 20 | 20 |

ACTUAL VALUES Y'(x,y)

FIG. 7

| | | | | | |
|---|---|---|---|---|---|
| 25 | 25 | 25 | 25 | 25 | 25 |
| 25 | 25 | 25 | 25 | 25 | 25 |
| 25 | 25 | 25 | 25 | 25 | 25 |
| 25 | 25 | 25 | 25 | 25 | 25 |

INPUT PIXELS X(x,y)

FIG. 12

| | | | | | |
|---|---|---|---|---|---|
| 15 | 7 | 13 | 5 | 15 | 7 |
| 3 | 11 | 1 | 9 | 3 | 11 |
| 12 | 4 | 14 | 6 | 12 | 4 |
| 0 | 8 | 2 | 10 | 0 | 8 |

NOISE VALUES N(x,y)

FIG. 13

| | | | | | |
|---|---|---|---|---|---|
| M | M | M | M | H | H |
| M | M | M | M | H | H |
| M | M | M | M | H | H |
| M | M | M | M | H | H |

CACHE HIT FOR
EXISTING BYPASS

FIG. 14

| | | | | | |
|---|---|---|---|---|---|
| 20 | 16 | 19 | 15 | 20 | 16 |
| 14 | 18 | 13 | 17 | 14 | 18 |
| 19 | 15 | 20 | 16 | 19 | 15 |
| 13 | 17 | 14 | 18 | 13 | 17 |

ACTUAL VALUES Y(x,y)

FIG. 15

| | | | | | |
|---|---|---|---|---|---|
| 25 | 25 | 25 | 25 | 25 | 25 |
| 25 | 25 | 25 | 25 | 25 | 25 |
| 25 | 25 | 25 | 25 | 25 | 25 |
| 25 | 25 | 25 | 25 | 25 | 25 |

INPUT PIXELS X(x,y)

FIG. 16

| | | | | | |
|---|---|---|---|---|---|
| 3 | 1 | 3 | 1 | 3 | 1 |
| 0 | 2 | 0 | 2 | 0 | 2 |
| 3 | 1 | 3 | 1 | 3 | 1 |
| 0 | 2 | 0 | 2 | 0 | 2 |

NOISE VALUES N(x,y)

FIG. 17

| | | | | | |
|---|---|---|---|---|---|
| M | M | M | M | H | H |
| M | M | M | M | H | H |
| M | M | M | M | H | H |
| M | M | M | M | H | H |

CACHE HIT FOR
EXISTING BYPASS

FIG. 18

| | | | | | |
|---|---|---|---|---|---|
| 14 | 13 | 14 | 13 | 14 | 13 |
| 12 | 14 | 12 | 14 | 12 | 14 |
| 14 | 13 | 14 | 13 | 14 | 13 |
| 12 | 14 | 12 | 14 | 12 | 14 |

ACTUAL VALUES Y(x,y)

FIG. 19

| | | | | | |
|---|---|---|---|---|---|
| 25 | 25 | 25 | 25 | 25 | 25 |
| 25 | 25 | 25 | 25 | 25 | 25 |
| 25 | 25 | 25 | 25 | 25 | 25 |
| 25 | 25 | 25 | 25 | 25 | 25 |

INPUT PIXELS X(x,y)

FIG. 20

| | | | | | |
|---|---|---|---|---|---|
| 3 | 1 | 3 | 1 | 3 | 1 |
| 0 | 2 | 0 | 2 | 0 | 2 |
| 3 | 1 | 3 | 1 | 3 | 1 |
| 0 | 2 | 0 | 2 | 0 | 2 |

NOISE VALUES N(x,y)

FIG. 21

| | | | | | |
|---|---|---|---|---|---|
| M | M | H | H | H | H |
| M | M | H | H | H | H |
| M | M | H | H | H | H |
| M | M | H | H | H | H |

CACHE HIT FOR EXISTING BYPASS

FIG. 22

| | | | | | |
|---|---|---|---|---|---|
| 14 | 13 | 14 | 13 | 14 | 13 |
| 12 | 14 | 12 | 14 | 12 | 14 |
| 14 | 13 | 14 | 13 | 14 | 13 |
| 12 | 14 | 12 | 14 | 12 | 14 |

ACTUAL VALUES Y(x,y)

FIG. 23

DITHER SPATIAL NOISE AWARE REDUNDANCY BYPASS

TECHNICAL FIELD

This disclosure relates to image processing.

BACKGROUND

Computing devices often utilize a graphics processing unit (GPU) to accelerate the rendering of graphics data for display, and a display processor to generate the signal that drives a display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. The display processor retrieves image content generated by the GPU, or other processing circuits, and further processes the image content to generate the signal to drive the display to cause the display to present the image content.

SUMMARY

This disclosure is directed to determining whether pixel processing for a pixel can be bypassed based on a combination of an input value of the pixel and an amount of dither spatial noise applied to the pixel. For example, a display processor includes processing circuitry that determines whether a current pixel has the same input value and is to be applied with the same amount of dither spatial noise as a previous pixel. The processing circuitry of the display processor may bypass the processing of the current pixel if the current pixel has the same input value and is to be applied with the same amount of dither spatial noise as the previous pixel, and copy the output pixel value for the previous pixel as the output pixel value for the current pixel.

In one example, the disclosure describes a method of generating image content, the method comprising determining a first input color value for a first pixel, determining a first dither value for the first pixel, determining a first output color value for the first pixel based on the first input color value and the first dither value, determining that a second input color value for a second pixel is same as the first input color value based on a comparison of the first input color value and the second input color value, determining that a second dither value for the second pixel is the same as the first dither value, and setting a second output color value for the second pixel based on the first output color value for the first pixel.

In one example, the disclosure describes a device for generating image content, the device comprising a pixel compute circuit and a bypass circuit. The pixel compute circuit is configured to determine a first input color value for a first pixel, determine a first dither value for the first pixel, and determine a first output color value for the first pixel based on the first input color value and the first dither value. The bypass circuit is configured to determine that a second input color value for a second pixel is same as the first input color value based on a comparison of the first input color value and the second input color value, determine that a second dither value for the second pixel is the same as the first dither value, and set a second output color value for the second pixel based on the first output color value for the first pixel.

In one example, the disclosure describes a device for generating image content, the device comprising means for determining a first input color value for a first pixel, means for determining a first dither value for the first pixel, means for determining a first output color value for the first pixel based on the first input color value and the first dither value, means for determining that a second input color value for a second pixel is same as the first input color value based on a comparison of the first input color value and the second input color value, means for determining that a second dither value for the second pixel is the same as the first dither value, and means for setting a second output color value for the second pixel based on the first output color value for the first pixel.

In one example, the disclosure describes a computer-readable storage medium storing instructions that when executed cause one or more processors of a device for generating image content to determine a first input color value for a first pixel, determine a first dither value for the first pixel, determine a first output color value for the first pixel based on the first input color value and the first dither value, determine that a second input color value for a second pixel is same as the first input color value based on a comparison of the first input color value and the second input color value, determine that a second dither value for the second pixel is the same as the first dither value, and set a second output color value for the second pixel based on the first output color value for the first pixel.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2 is a conceptual diagram illustrating an example of dither noise matrix.

FIG. 3 is a conceptual diagram illustrating an example of input color values.

FIG. 4 is a conceptual diagram illustrating an example of noise values.

FIG. 5 is a conceptual diagram illustrating an example of desired output color values.

FIG. 6 is conceptual diagram illustrating an example of cache hits and misses.

FIG. 7 is conceptual diagram illustrating an example of actual output color values.

FIG. 12 is another conceptual diagram illustrating an example of input color values.

FIG. 13 is another conceptual diagram illustrating an example of noise values.

FIG. 14 is another conceptual diagram illustrating an example of cache hits and misses.

FIG. 15 is another conceptual diagram illustrating an example of actual output color values.

FIG. 16 is another conceptual diagram illustrating an example of input color values.

FIG. 17 is another conceptual diagram illustrating an example of noise values.

FIG. 18 is another conceptual diagram illustrating an example of cache hits and misses.

FIG. 19 is another conceptual diagram illustrating an example of actual output color values.

FIG. 20 is another conceptual diagram illustrating an example of input color values.

FIG. 21 is another conceptual diagram illustrating an example of noise values.

FIG. 22 is another conceptual diagram illustrating an example of cache hits and misses.

FIG. 23 is another conceptual diagram illustrating an example of actual output color values.

DETAILED DESCRIPTION

Figure 1:
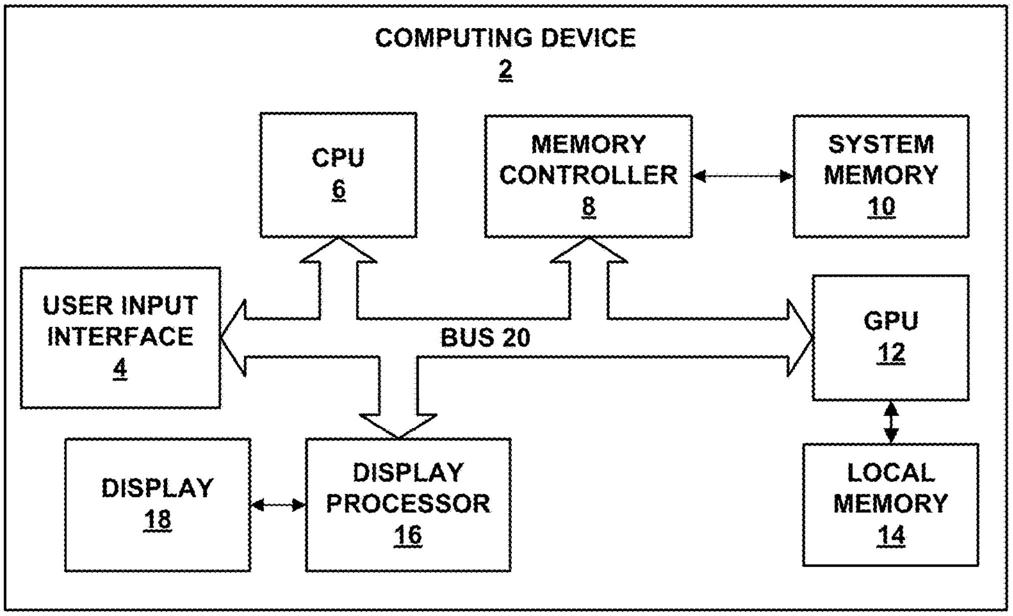
FIG. 1 is a block diagram illustrating an example computing device that may be used to implement the techniques of this disclosure.

A display processor is a real-time pixel processing circuit that generates display signals based on colors of pixels to be displayed. The display signals are what a display uses to reproduce the pixel.

Some example display processors purposefully add "dither" to smooth out image content. For instance, simple truncation of bits, which may occur during the pixel processing, can produce visible contouring in the displayed picture. Dither is a form of noise used to randomize such quantization error.

There may be various ways in which to add dither, and as one example, the display processor may store a matrix of dither values, and add those dither values to color values of respective corresponding pixels. As an example, a dither noise matrix may be a 4×4 matrix of values, and the display processor may add the first value of the 4×4 matrix to a color value of a first pixel of a 4×4 block of pixels, a second value of the 4×4 matrix to a color value of a second pixel of the 4×4 block of pixels, and so forth. Adding color values means that the display processor may add the values to the red, green, and blue components of the pixel. The red-green-blue components are one example of the color space, and other examples such as Y, Cr, Cb are possible as well.

Display processors may also include circuitry to perform operations of a bypass algorithm. In the bypass algorithm, if a particular color value for a first pixel had been processed before (e.g., a final color value was determined that pixel based on added dither), then rather than processing the same color value again for a second pixel, the final color value for the first pixel is set (e.g., copied) as the final color value for the second pixel.

One possible issue with the bypass algorithm is that the bypass algorithm may not account for the dither. For example, a first pixel and a second pixel may have the same color value. However, the dither added to the color value of the first pixel and the dither added to the color value of the second pixel may be different. In some other techniques, because the color values of the first and second pixels are the same, the display processor may have copied the final color value for the first pixel as the final color value for the second pixel, as part of the bypass algorithm. In this case, the final color value for the second pixel would be incorrect because the dither for the second pixel was different than that for the first pixel.

In the example techniques described in this disclosure, the bypass algorithm may be initiated when the color value of a pixel is the same as a color value of a previous pixel, and the dither for the pixel is the same as the dither for the previous pixel. If both conditions are true, then the display processor may bypass the processing of the pixel and copy the color values of the previous pixel, after processing, as the color values for the pixel.

There may be various ways in which to determine if the dither for a first pixel is the same as the dither for a second pixel. As an example, each pixel in the image may be associated with a dither spatial location in the dither noise matrix. If a first pixel and a second pixel have the same color value and are associated with the same dither spatial location in the dither noise matrix, the display processor may determine that the dither for a first pixel is the same as the dither for a second pixel. For example, processing circuitry, of the display processor, may have determined the amount of dither spatial noise to apply to a previous pixel based on a position in the dither noise matrix. If the processing circuitry determined that the current pixel is to be applied with the dither spatial noise based on the same position in the dither noise matrix as the previous pixel, the processing circuitry may determine that the same amount of dither spatial noise is to be applied to the current pixel.

FIG. 1 is a block diagram illustrating an example computing device 2 that may be used to implement techniques of this disclosure. Computing device 2 may comprise a camera, a computer (e.g., personal computer, a desktop computer, a laptop computer, a tablet computer and/or a computer workstation), a video game platform or console, a mobile device such as wireless communication device (e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a set-top box, a broadcast receiver, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display processor 16, a display 18, and bus 20. User input interface 4, CPU 6, memory controller 8, GPU 12 and display processor 16 may communicate with each other using bus 20. Bus 20 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a media editing application, a video game application, a graphical user interface application, a teleconferencing application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6, forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated circuits or discrete logic circuits.

GPU 12 may be directly coupled to GPU local memory 14. Thus, GPU 12 may read data from and write data to GPU local memory 14 without necessarily using bus 20. In other words, GPU 12 may process data locally using local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display processor 16 may retrieve the data from the frame buffer and configure display 18 to display the image represented by the rendered image data. In some examples, display processor 16 may include a digital-to-analog converter (DAC) that is configured to convert the digital values retrieved from the frame buffer into an analog signal consumable by display 18. In other examples, display processor 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

Display processor 16 may be implemented as any of a variety of suitable fixed-function and/or programmable circuitry, such as one or more microprocessors, a digital signal processor (DSP), an application specific integrated circuit (ASIC), field programmable gate array (FPGA), discrete logic, and the like. In some examples, display processor 16 may be integrated with other processing circuitry of computing device 2, such as CPU 6 and/or GPU 12, or may be a stand-alone processor, as illustrated in FIG. 1.

Display processor 16 may be configured to perform some post-processing functions on image content. For example, a video decoder (not shown) may generate video pictures that are to be displayed, and store the video pictures in system memory 10. A camera processor (not shown) may store a captured image in system memory 10. GPU 12 may generate graphics images, and store the graphics images in system memory 10. Display processor 16 may retrieve such images, regardless of where the images were generated from, perform one or more post-processing functions on the images, and cause display 18 to display the images, as processed by display processor 16.

The term "post-processing" is used in this disclosure to mean that display processor 16 performs processing functions on composed images, such as some blending, overlay, compositing, rotation, upscaling, downscaling, etc., and generally, operations on a two-dimensional image frame that has been rendered. In some examples, display processor 16 may not perform any functions on the images that are being generated by the video decoder, the camera processor, or GPU 12 while the images are being generated. Once these processing circuits generate and store respective composed images (e.g., as an array of pixels), then display processor 16 may retrieve the images from system memory 10 and perform its processing functions.

Display processor 16 may be configured to perform various types of post-processing. As one example, display processor 16 may perform picture adjustment where display processor 16 globally adjusts image perceptual attributes of each of the colors in the images retrieved from system memory 10. Perceptual attributes refer to a measure of perceivable attributes of the colors within the image. For instance, examples of perceptual attributes include hue, saturation, brightness, and contrast of the colors within the image.

As another example, display processor 16 may be configured to perform color correction. Color correction addresses color rendering deficiencies in display 18. As yet another example, display processor 16 may be configured to perform gamut correction to ensure that the color of the pixels is within a range that display 18 can display.

As a further example, display processor 16 may be configured to dither the color values of the image. Dither is an intentionally applied form of noise used to randomize quantization error, preventing large-scale patterns such as color banding in images. For instance, truncation of bits in the color values generated by processing circuits of device 2 produce visible contouring in the displayed image. Display processor 16 preforms dithering to add visually pleasing noise, called dither noise, to the image, which may reduce the unwanted effect of contouring produced by bit-depth reduction (e.g., truncating of bits). As further explanation of dithering, ordered dithering, which is one form of dithering, is a spatial dithering algorithm that is well suited for display processor 16 to perform. Ordered dithering introduces pseudo-random quantization error into the displayed picture to break up contours.

Display processor 16, also called display processing unit (DPU), may be configured to perform these example operations in real-time (e.g., during the execution of the application generating the image content so that the image content can be displayed at a certain frames-per-second). These various example operations of display processor 16 are performed by pixel compute circuits, which may be separate circuits or a combination of circuits. These pixel compute circuits may constitute more than one-fourth of the total power of display processor 16.

As the demand for higher performing pixel processing increases with more complex algorithms and higher operating frequency, the power consumption of display processor 16 may increase. As an example, for virtual reality (VR)/augmented reality (AR) application, display processor 16 may need to generate 8K resolution at 120 frames-per-second (fps), and may consume a lot of power.

One possible technique to reduce the consumption of power is to exploit redundancies in the pixel processing. As one example, display processor 16 may receive an input color value for a first pixel, perform pixel processing, and generate an output color value for the first pixel. Then, for a second pixel having the same input color value, rather than perform the pixel processing via the pixel compute circuits, display processor 16 may bypass the pixel processing and set the output color value for the second pixel to the same as the output color value for the first pixel.

However, such bypass techniques fail to account for the differing dither noise that may be added to pixels having the same color values. For instance, in the above example, the first and second pixels may have the same input color values, but the dither noise added to each may be different, resulting in different output color values. In techniques where the output color value for the first pixel is copied as the output color value for the second pixel because the input color values are the same, the output color value for the second pixel may be erroneous for failure to account for the different dither noise that is to be added to the input color value for the second pixel relative to the dither noise that is added to the input color values for the first pixel.

The example techniques described in this disclosure track both the input color values for pixels and the dither noise that is to be added. Display processor 16 may bypass the pixel processing for a current pixel, and instead copy the output color values for a previously processed pixel if both of the following conditions are true: (1) the input color value (e.g., color value from system memory 10) for the current pixel and the previously processed pixel is the same, and (2) the dither noise applied to previously processed pixel is the same as the dither noise that is to be applied to the current pixel. If both conditions are not true (e.g., dither noise is different but input color values are the same), display processor 16 may then process the current pixel via one or more of the pixel compute circuits, rather than bypass the processing.

FIG. 2 is a conceptual diagram illustrating an example of a dither noise matrix, which may be stored in system memory 10 or local memory of display processor 16. As illustrated, the dither noise matrix is a 4×4 matrix, but other sized matrices are possible. Each position in the dither noise matrix corresponds to a dither value. A dither circuit of display processor 16 may perform operations on a block of pixels based on the positions of the pixels in the blocks and corresponding locations of dither values in the dither noise matrix. For instance, the dither applied to a pixel located at (0, 0) in a 4×4 block may be based on the dither value in position (0, 0) in the dither noise matrix, the dither applied to a pixel located (0, 1) in the 4×4 block may be based on the dither value in position (0, 1) in the dither noise matrix, and so forth.

A dither circuit of display processor 16 may receive as input the color value of a pixel. The color value of a pixel may include a red, green, and blue-component, and each component may be represented by 8-bits, referred to as RGB 888 format. A dither circuit of display processor 16 may adjust dither noise matrix illustrated in FIG. 2, if needed, based on a target bit depth, add the values to each of the color component values, and clamp the resulting value between 0 and 255 so that the red, green, and blue-components of the output color value are each 8-bit values. In some examples, the output color value may be quantized based on an output bit-depth if less than 8-bits are needed.

For instance, bit depth or color depth indicates the number of bits used to represent an attribute (e.g., color is one example attribute) of a pixel. For instance, in RGB 888 format, there are 24 bits per pixel (bpp), with 8 bits for red-component, 8 bits for green-component, and 8 bits for blue-component. The input bit depth is the number of bits used to define an attribute (e.g., color) of the input pixel that is being processed, and output bit depth is the number of bits used to define the attribute of the output pixel that is generated from the processing. For instance, of RGB 888, the input bit depth is 8 bits (e.g., 8 bits per component). If the format for the output pixel is also RGB 888, then the output bit depth is 8 bits. For RGB 101010, the input bit depth is 10 bits, and if the format for the output pixel is RGB 666, then the output bit depth is 6 bits.

The dither noise matrix adjustment may be predetermined or performed by display processor 16 based on the output color bit depth and the color component of the image. For instance, to reduce the number of color bits by N bits per pixel, display processor 16 may scale the dither noise matrix (e.g., as illustrated in FIG. 2) based on the value of N and add the dither noise matrix to the pixels in the image. A general formula for scaling a dither noise matrix is:

Adjusted Dither noise matrix=(Dither noise matrix)/($2^{4-N}$), where $N$ is defined input bit depth−output bit depth.

As an example, when converting from 30 bpp color depth for the input pixel to 18 bpp for the output pixel, the number of bits for each of the RGB components being reduced from 10 bits to 6 bits. In this example, input bit depth is 10 bits, the output bit depth is 6, and therefore N is 4. In this case, the dither noise matrix will be same as illustrated in FIG. 2.

However, when converting from 30 bpp color depth for the input pixel to 24 bpp for the output pixel, the number of bits for each of the RGB components being reduced from 10 bits to 8 bits. In this example, input bit depth is 10 bits, the output bit depth is 8, and therefore N is 2. In this case, the dither noise matrix will be each value in the dither noise matrix illustrated in FIG. 2 divided by $2^2$.

As discussed above, in some techniques, it may be possible to bypass the processing of a current pixel if the input color value for the current pixel is the same as the input color value for a previous pixel. However, failure to account for the dither may result in incorrect output color values. FIGS. 3-7 illustrate how incorrect output values may be generated when the dither is not accounted for.

FIG. 3 is a conceptual diagram illustrating an example of input color values. For example, FIG. 3 illustrates input pixels X(x,y), which are in a 6×4 block of pixels, and each have the value of 25. In this example, the color value of 25 may be considered as a color value for one of the RGB components.

FIG. 4 is a conceptual diagram illustrating an example of noise values. For instance, FIG. 4 illustrates noise values N(x,y). The noise values may be a copy of the dither noise matrix illustrated in FIG. 2. However, the dither noise matrix is sized 4×4, and the input pixel block is 6×4. Therefore, for the noise values, the first two columns of the dither noise matrix of FIG. 2 is copied as the last two columns of the noise values.

In this example, assume that the dither operation is as follows:

$Y(x,y)=(X(x,y)+N(x,y))/2$, where $Y(x,y)$ is the output pixel values.

FIG. 5 is a conceptual diagram illustrating an example of desired output color values. For example, a dither circuit of display processor 16 may perform the operations of Y(x,y) described above to the input pixel values and noise values, and the results of the operation are shown in FIG. 5. As one example, X(0,0) is equal to 25, and N(0,0) is equal to 15, and (25+15)/2 is equal to 20. Therefore, Y(0,0) is equal to 20. Similarly, X(1,0) is equal to 25, and N(1,0) is equal to 7, and (25+7)/2 is equal to 16. Therefore, Y(1,0) is equal to 16.

The above is one example of the equation for Y(x,y). However, other equations for Y(x,y) are possible, including those based on the values of x and y. For instance, if x and y are both odd, then Y(x,y) may be a first equation (F(x,y)), if x is even and y is odd, then Y(x,y) may be a second equation (G(x,y)), if x is odd and y is even, then Y(x,y) may be third equation (H(x,y)), and if x and y are both even, then Y(x,y) may be fourth equation (I(x,y)).

However, when display processor 16 bypasses pixel processing based on the input pixel value, the output pixel values may not be correct. For instance, for the bypass operation, display processor 16 receives input pixel value (an example of which is an input color value) for a current pixel, and determines whether its local memory, such as cache, stores information indicating that a previous pixel had the same input pixel value. If display processor 16 determines that a previous pixel had the same input pixel value (e.g., a cache hit), then display processor 16 sets the output pixel value of the current pixel equal to the stored output pixel value of the first pixel. If display processor 16 determines that the cache does not store information for a previous pixel that had the same input such as because the current pixel is the first instance of the pixel value (e.g., a cache miss), then display processor 16 processes the input pixel value of the current pixel to generate the output pixel value for the current pixel.

FIG. 6 is conceptual diagram illustrating an example of cache hits and misses. In FIG. 6, "M" means cache miss, and "H" means cache hit. As illustrated in FIG. 6, for the first input pixel X(0,0), the value is 25, and cache of display processor 16 may not have stored information indicating that a pervious pixel had the input pixel value of 25. Therefore, for location (0,0) in FIG. 6, the letter "M" is shown to indicate that a cache miss occurred. In this case, the dither circuit of display processor 16 performs the operations of Y(x,y) to generate a value of 20.

FIG. 7 is conceptual diagram illustrating an example of actual output color values. For instance, FIG. 7 illustrates Y'(x,y), and the value for Y'(x,y) is 20 because (25+15)/2 is 20.

Then for a second input pixel X(0,1), the value is 25, and display processor 16 may have determined that a previous pixel (e.g., the first input pixel) had the same input pixel value of 25 as that of the second pixel. In this case, display processor 16 may bypass the dither circuit, and set the output pixel value for the second input pixel X(0,1) equal to the output pixel value for the first input pixel X(0,1), which was 20. Therefore, in FIG. 7, for Y'(0,1), the value is illustrated as 20.

However, the desired output pixel value for the input pixel X(0,1) is 16, as illustrated in Y(0,1) in FIG. 5. But, when the dither circuit is bypassed, the actual output pixel value for the input pixel X(0,1) was 20. In this way, failure to account for the dither value may result in generating incorrect output pixel values.

This disclosure describes example techniques for dither spatial noise aware redundancy comparison. One way to perform such dither noise aware redundancy comparison is to track the position in the dither noise matrix for the dither value that is to be applied to the input color value (or a processed version of the input color value), and update the position at appropriate timestamp, as described in more detail.

Figure 8:
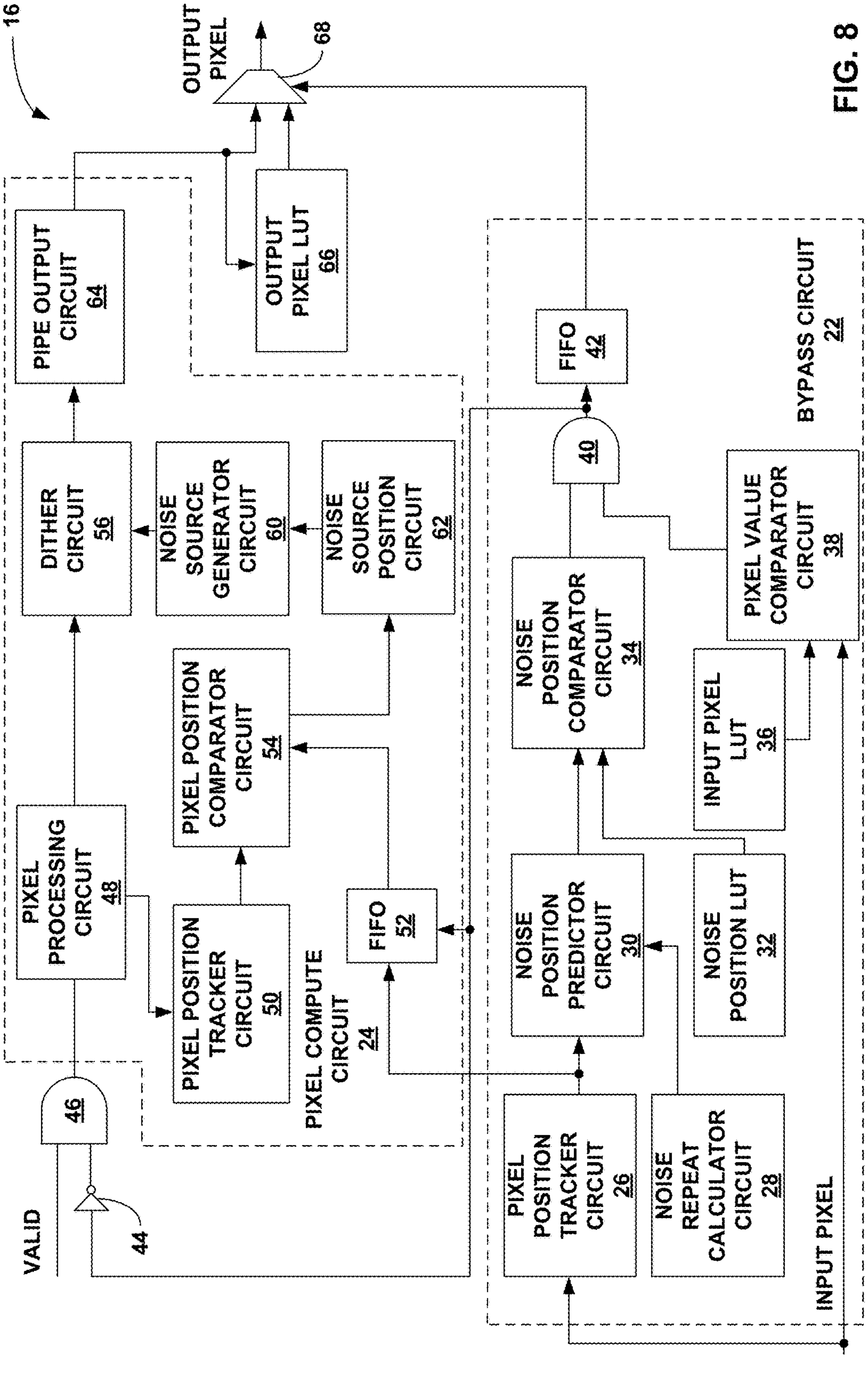
FIG. 8 is a block diagram illustrating an example of a display processor of FIG. 1 in greater detail.

FIG. 8 is a block diagram illustrating an example of a display processor of FIG. 1 in greater detail. As illustrated, display processor 16 includes bypass circuit 22 and pixel compute circuit 24. Bypass circuit 22 may be configured to cause multiplexer (MUX) 68 to output an output color value stored in output pixel lookup table (LUT) 66 when both the input color value of a current pixel and the input color value of a previous pixel are the same, and when the dither value applied to the input color value (or a processed version of the input color value) of the previous pixel is the same as the dither value that is to be applied to the input color value of the current pixel (or a processed version of the input color value). Although shown external to bypass circuit 22, in some examples, output pixel LUT 66 may be part of bypass circuit 22.

Pixel compute circuit 24 is configured to perform operations on the input color value of the current pixel. The operations that pixel compute circuit 24 may perform include operations such as picture adjustment, color correction, gamut correction, and dither. For example, pixel compute circuit 24 includes pixel processing circuit 48 and dither circuit 56. Pixel processing circuit 48 may be configured to perform one or more of the picture adjustment, color correction, or gamut correction. Dither circuit 56 may be configured to add dither noise to the input color value of the current pixel, if applicable.

Pixel compute circuit 24 may be configured to perform mathematical operations (e.g., additions, subtraction, multiplication, division, etc.) on the input color value of a current pixel that is being processed. Bypass circuit 22 may not perform mathematical operations on the input color value itself. However, bypass circuit 22 may perform operations such as comparison of the input color value, but may not substantially change the input color value. De minims changes to the input color values may be possible. In some examples, it may be possible for bypass circuit 22 to perform operations on the input color value for purposes of comparing the input color value.

Also, bypass circuit 22 may perform operations on the actual color values. For instance, bypass circuit 22 may not perform operations on residuals between the actual color values and prediction color values.

Bypass circuit 22 may consume less power relative to pixel compute circuit 24. For example, the operations performed by pixel compute circuit 24 may require operations that tend to consume power and time, whereas the comparisons and other such operations that bypass circuit 22 is to perform consume relatively low amount of power and time. Accordingly, where possible, it may be beneficial for bypass circuit 22 to cause MUX 68 to output the output color value from output pixel LUT 66.

Bypass circuit 22 includes noise repeat calculator circuit 28. Noise repeat calculator circuit 28 may be configured to determine how often the dither values are to repeat when applying the dither values to a line of input pixels. For example, as illustrated in FIGS. 2 and 4, the dither noise matrix is a 4×4 dither noise matrix. For a first pixel in a line of pixels, the first dither value in the first line of the 4×4 dither noise matrix is applied, for a second pixel in a line of pixels, the second dither value in the first line of the 4×4 dither noise matrix is applied, and so forth. For the fifth pixel in the line of pixels, the first dither value in the first line of the 4×4 dither noise matrix is applied (e.g., the first dither value is repeated).

Noise repeat calculator circuit 28 may be configured to determine when the dither value in the dither noise matrix is to repeat, and may perform such determination based on the size of the dither noise matrix. In some examples, noise repeat calculator circuit 28 may resize or adjust the dither noise matrix based on the input and output bit depths described above.

Pixel position tracker circuit 26 may track the position of the current pixel being processed. For instance, pixel position tracker circuit 26 may determine the position of the input pixel (e.g., current pixel) in a line of pixels of the image content retrieved from system memory 10, and assign the current pixel a coordinate position value. The first pixel in the line of pixels may be assigned a position of (0,0), the second pixel in the line of pixels may be assigned a position of (0,1), and so forth.

For ease of description, the example techniques are described with respect to a row of pixels and a row in the dither noise matrix. However, the techniques are applicable to column-wise processing as well. Therefore, the term "line" is used generically to refer to a row or column.

Noise position predictor circuit 30 determines the position in the dither noise matrix based on the position of the current pixel in the line by pixel position tracker circuit 26, and the determination of when the dither values repeat from noise repeat calculator circuit 28. For example, for the pixel located at (0,0), as determined by pixel position tracker circuit 26, noise position predictor circuit 30 may determine that dither value at location (0,0) in the dither noise matrix is to be applied for the current pixel. For the pixel located at (5,0), as determined by pixel position tracker circuit 26, noise position predictor circuit 30 may determine that dither value at location (2,0) in the dither noise matrix, assuming 4×4 dither noise matrix, is to be applied for the current pixel because noise repeat calculator circuit 28 determined that after every four dither values in a line, the dither values are to repeat since a line in the dither noise matrix is four dither values.

It should be understood that the dither values may be applied to the input color values or after some processing on the input color values (e.g., via pixel processing circuit 48) as described below. This disclosure captures both examples.

The following describes examples for ways in which bypass circuit 22 may be used to bypass processing on input color values. However, the techniques are not limited to the below examples. There may be other ways in which to determine whether to bypass processing of input color values.

Noise position LUT 32 may store only noise position, and input pixel LUT 36 may store input color value. In some examples, the mapping of dither noise position and pixel value are based on location of storage. For example, if there are 4 total locations, noise position in first location of noise position LUT 32 corresponds to pixel value in first location of input pixel LUT 36. Similarly, second location in noise position LUT 32 corresponds to second location in input pixel LUT 36, and so on.

Noise position comparator circuit 34 outputs the matched location (e.g., HIT location) along with logic one. Similarly, pixel value comparator circuit 38 outputs the matched location (e.g., HIT location) along with logic one. As an example, if the noise position from noise position LUT 32 and noise position predictor circuit 30 is the same, noise position comparator circuit 34 may output a logic one and the location in noise position LUT 32 that stored the noise position value that is the same as noise position from noise position predictor circuit 30. Similarly, if the input pixel color value is the same as color value stored in input pixel LUT 36, pixel value comparator circuit 38 may output a logic one and the location in input pixel LUT 36 that stored the input color values that is the same as the input pixel color.

AND gate 40 receives the outputs from noise position comparator circuit 34 and pixel value comparator circuit 38, and performs the AND operation. For instance, if both noise position comparator circuit 34 and pixel value comparator circuit 38 output a logic one and the location in noise position LUT 32 and input pixel LUT 36 is the same (as identified by the outputs for noise position comparator circuit 34 and pixel value comparator circuit 38), AND gate 40 outputs a logic one. Otherwise, AND gate 40 outputs a logic zero. In this example, for AND gate 40 to output a logic one, two criteria should be satisfied: (1) the output from noise position comparator circuit 34 and the output from pixel value comparator circuit 38 should be a logic one, and (2) noise position comparator circuit 34 outputs a location in noise position LUT 32 that stored the noise position that is same as the output of noise position predictor circuit 30, and pixel value comparator circuit 38 outputs a location in input pixel LUT 36 that stored the color value that is same as input pixel color value; both of these locations should be same. If both of these conditions are satisfied, AND gate 40 may output a logic one.

The output of AND gate 40 indicates a "hit" or a "miss." For instance, when there is a hit, it means that display processor 16 had previously processed a pixel having the same input color value as the current pixel. Also, the dither value applied to the previously processed pixel is the same as the dither value that is to be applied to the current pixel because the position in the dither noise matrix that corresponds to the dither value that is to be applied to the current pixel is the same as the position in the dither noise matrix that was determined for the previously processed pixel.

First-in-first-out (FIFO) buffer 42 receives the output of AND gate 40 and controls whether MUX 68 outputs color values from output pixel LUT 66 or pixel compute circuit 24. If there is a MISS transaction (e.g., input pixel LUT 36 does not store a pixel color value that is the same as the input pixel color value or noise position LUT 32 does not store a noise position that is same as output from noise position predictor circuit 30), the least accessed location in noise position LUT 32 and input pixel LUT 36 may be replaced by current pixel noise position and pixel value respectively. Also, if there is a MISS transaction, FIFO buffer 42 may store latest access location (e.g., location in which current pixel values and noise positions are stored) along with MISS (e.g., logic zero). If there is a HIT transaction (e.g., input pixel LUT 36 does store a pixel color value that is the same as the input pixel color value and noise position LUT 32 does store a noise position that is same as output from noise position predictor circuit 30 and locations in noise position LUT 32 and input pixel LUT 36 is the same), FIFO buffer 42 may store the matched/HIT position in noise position LUT 32 and input pixel LUT 36 along with HIT (e.g., logic one) information.

Output pixel LUT 66 stores output color values. A position in output pixel LUT 66 corresponds to positions in input pixel LUT 36 and noise position LUT 32. In the case of HIT (e.g., from AND gate 40), output pixel LUT 66, from FIFO buffer 42, may receive information indicating the positions in one or more both of input pixel LUT 36 and noise position LUT 32 that stored the input color value and noise position value, respectively, that resulted in the HIT. Output pixel LUT 66 may then output the color value stored in location that is the same as the location in one or more both of input pixel LUT 36 and noise position LUT 32 that stored the input color value and noise position value, respectively, that resulted in the HIT.

If AND gate 40 outputs a logic one, then there was a hit, meaning that output pixel LUT 66 stores an output color value that was previously determined. For instance, if AND gate 40 outputs a logic one, then there was a previously processed pixel that had the same input color value as the current pixel. Also, the dither value applied to the previous pixel is the same as that which is to be applied to the current pixel because the position in the dither noise matrix for the dither value applied to the previous pixel is the same as the position in the dither noise matrix for the dither value that is to be applied to the current pixel.

When AND gate 40 outputs a logic one, output pixel LUT 66 outputs the output color value associated with the input color value and position in the dither noise matrix. MUX 68 then outputs the output color value as the color value for the current pixel. In this way, display processor 16 determines the output color value for the current pixel without needing to perform complex operations on the input color value of the current pixel which save power and time. Furthermore, display processor 16 may determine the output color value for the current pixel without needing to perform complex operations when both the input color value for the current pixel and a previous pixel is the same, and when the dither value applied to the input color value for the current pixel and the previous pixel is the same. The dither value applied to the input color value for the current and previous pixel is the same when the position in the dither noise matrix of the dither value applied to the input pixel value for the previous pixel is the same as the position in the dither noise matrix of the dither value that is to be applied to the input pixel value for the current pixel.

If AND gate 40 outputs a logic zero, then there is a miss, meaning that output pixel LUT 66 does not store the output pixel value, and pixel processing should occur on the input pixel. In this example, MUX 68 may select the output from pipe output circuit 64 of pixel compute circuit 24 as the output pixel value, rather than from output pixel LUT 66.

As illustrated, the output of AND gate 40 also feeds to inverter 44, and the output of inverter 44 feeds to AND gate 46. AND gate 46 also includes a valid input that indicates whether the input pixel is a valid pixel or not. GPU 12 may designate a pixel as valid or not valid. Alternatively, all pixels may be determined to be valid such at the valid input is always at a logic one.

If the output of AND gate 40 is a logic zero, it means that there is a miss, and the output of inverter 44 is a logic one. If the valid input is also a logic one, then the output of AND gate 46 is a logic one, and pixel compute circuit 24 may perform pixel processing. If the output of AND gate 40 is a logic one, it means that there is a hit, and the output of inverter 44 is a logic zero. In this case, regardless of whether valid input is a logic one or logic zero, the output of AND gate 46 will be a logic zero, which means that pixel compute circuit 24 does not perform any pixel processing, which saves power.

In the example, where pixel compute circuit 24 is to perform pixel processing, pixel processing circuit 48 may perform pixel processing such as gamut correction, color correction, and/or other example operations. In addition, pixel position tracker circuit 50 may be configured to track the position of the input pixel similar to pixel position tracker circuit 26 of bypass circuit 22.

In examples described in this disclosure, one potential issue may be if the position in the dither noise matrix is not properly accounted for. Dither circuit 56 may be configured to perform the example dither operations on the input color value based on the dither value in the dither noise matrix as determined by noise source generator circuit 60. For instance, noise source generator circuit 60 may receive information indicating the position in the dither noise matrix, and determine the dither value based on the position in the dither noise matrix.

Noise source position circuit 62 may be configured to determine the position in the dither noise matrix for the input pixel value, and may output the determined position to noise source generator circuit 60. If bypass circuit 22 were not used, then noise source generator circuit 60 would proceed through dither noise matrix similar to noise position predictor circuit 30 of bypass circuit 22. However, there may be some instances when the position in the dither noise matrix should be updated even though pixel compute circuit 24 did not perform any operations.

As an example, assume that for a first pixel associated with a first position in the dither noise matrix, pixel compute circuit 24 performed operations (e.g., because miss from bypass circuit 22). Then, assume that for a second pixel associated with a second position in the dither noise matrix, pixel compute circuit 24 did not perform any operations, and instead, bypass circuit 22 performed comparisons to determine that there was a hit (e.g., the output of AND gate is 40 is a logic one). Then, assume that for a third pixel associated with a third position in the dither noise matrix, pixel compute circuit 24 is to perform operations (e.g., because miss from bypass circuit 22).

However, because pixel compute circuit 24 did not perform any operations on the second pixel, noise source position circuit 62 did not get updated to move from positions in the dither noise matrix. In this case, rather than determining the third position in the dither noise matrix as the position associated with the third pixel, noise source position circuit 62 may determine that the second position is the position in the dither noise matrix because noise source position circuit 62 was not updated when there was a hit. As described above, the second position is associated with the second pixel, but here, dither circuit 56 may apply the dither value associated with the second position in the dither noise matrix causing not only the color value for the current pixel to be incorrect, but pixels following the current pixel.

Pixel position tracker circuit 50, pixel position comparator circuit 54, and FIFO buffer 52 may be configured to ensure that noise source position circuit 62 is properly updated. For example, FIFO buffer 52 receives the pixel position of the input pixel from pixel position tracker circuit 26. As illustrated, the output of AND gate 40 is also coupled to FIFO buffer 52. In this example, if the output of AND gate 40 is a logic one, FIFO buffer 52 outputs a stored pixel position, and if the output of AND gate 40 is a logic zero, FIFO buffer 52 does not output a stored pixel position.

If the output of AND gate 40 is a logic one, it means that pixel compute circuit 24 did not perform any operations on that pixel. If pixel position comparator circuit 54 receives an output from FIFO buffer 52, in some examples, pixel position comparator circuit 54 may cause noise source position circuit 62 to advance one position in the dither noise matrix to ensure that noise source position circuit 62 is aligned with the proper position in the dither noise matrix.

However, in some examples, it may not be sufficient to merely advance noise source position circuit 62 based on the output of FIFO buffer 52. For example, as described in more detail with respect to FIGS. 24-27, in some examples, pixel compute circuit 24 may be one pixel compute circuit 24 in a plurality of pixel compute circuits. In such examples, different ones of pixel compute circuits may be operating on different pixels at any given time. When processing of a pixel is to be bypassed, bypass circuit 22 may bypass the plurality of pixel compute circuits.

Accordingly, there may be possibility that bypass circuit 22 may cause FIFO buffer 52 to output pixel position of a pixel for which pixel compute circuit 24 is not perform any operations, but pixel compute circuit 24 may be performing operations on a much earlier pixel because each one of pixel compute circuits may be operating on different pixels. To avoid incorrectly advancing noise source position circuit 62, pixel position comparator circuit 54 may receive the pixel position of the current pixel that is being processed by pixel compute circuit 24 from pixel position tracker circuit 50 and pixel position from FIFO buffer 52 for a pixel on which pixel compute circuit 24 is not perform operations.

For example, pixel position tracker circuit 50 may determine the position of the next pixel after the current pixel that is being processed. If the position of the next pixel and the position of the pixel outputted by FIFO buffer 52 is same, as determined by pixel position comparator circuit 54, then pixel position comparator circuit 54 may output information that causes noise source position circuit 62 to advance the position in the dither noise matrix. This way, even if the pixel position of the pixel that pixel compute circuit 24 is processing is different than the pixel position of the pixel that bypass circuit 22 received, noise source position circuit 62 may be properly updated to align with the correct position in the dither noise matrix.

Dither circuit 56 may receive a color value from pixel processing circuit 48 and perform the dither operations (e.g., the Y(x,y) operations described above) to determine an output color value. Pipe output circuit 64 receives the output color value, and in some examples, stores the output color value, along with the corresponding input color value and position in the dither noise matrix, in output pixel LUT 66 so that if another pixel having the same input color value is received and the dither value in the same position in the dither noise matrix is to be applied, then output pixel LUT 66 may be able to directly output the output pixel value bypassing the operations in pixel compute circuit 24.

In this way, FIG. 8 illustrates an example manner in which if both the input color value and the dither value is the same for the current pixel and a previous pixel, then processing of the current pixel can be bypassed. For instance, for a first pixel, pixel compute circuit 24 may determine (e.g., receive) its input color value and its dither value. For instance, noise source position circuit 62 may determine the position in the dither noise matrix for the first pixel based on the position of the first pixel in a line of pixels, and noise source generator circuit 60 may determine the dither value based on the position. In this example, pixel compute circuit 24 may determine the first output color value with post-graphics processing such as color correction, gamut correction, and other such examples.

Then for a second pixel, bypass circuit 22 may determine that the input color value for the second pixel is same as input color value for the first pixel (e.g., via input pixel LUT 36 and pixel value comparator circuit 38), and may determine that the dither value for the second pixel is same as the dither value for the first pixel (e.g., via noise position LUT 32 and noise position comparator circuit 34). For example, noise position predictor circuit 30 may determine that a position in the dither noise matrix based on a position of the second pixel in the line of pixels. Noise position comparator circuit 34 may determine that the dither value for the second pixel is the same as the dither value for the first pixel based on the determination that the position in the dither noise matrix for the second pixel is the same as the position in the dither noise matrix for the first pixel.

In this example, because both the first pixel and the second pixel have the same input color value and because both the first pixel and the second pixel are to have same dither value applied, output pixel LUT 66 may set the output color value of the second pixel based on the output color value of the first pixel (e.g., without using the dither value for the second pixel to determine the output color value for the second pixel). This allows bypass circuit 22, which is different than the pixel compute circuit 24, to set the output color value for the second pixel, and the bypass circuit 22 does not perform post-graphics processing on the input color value of the second pixel.

For example, input pixel LUT 36 may store information indicative of the input color value of the first pixel and noise position LUT 32 a position in the dither noise matrix, for the first pixel, that includes the first dither value. For the second pixel, bypass circuit 22 may determine a position in the dither noise matrix. In this example, bypass circuit 22 may determine that the position in the dither noise matrix and the color value of the first and second pixels is the same based on the information stored in noise position LUT 32 and input pixel LUT 36.

Figure 9:
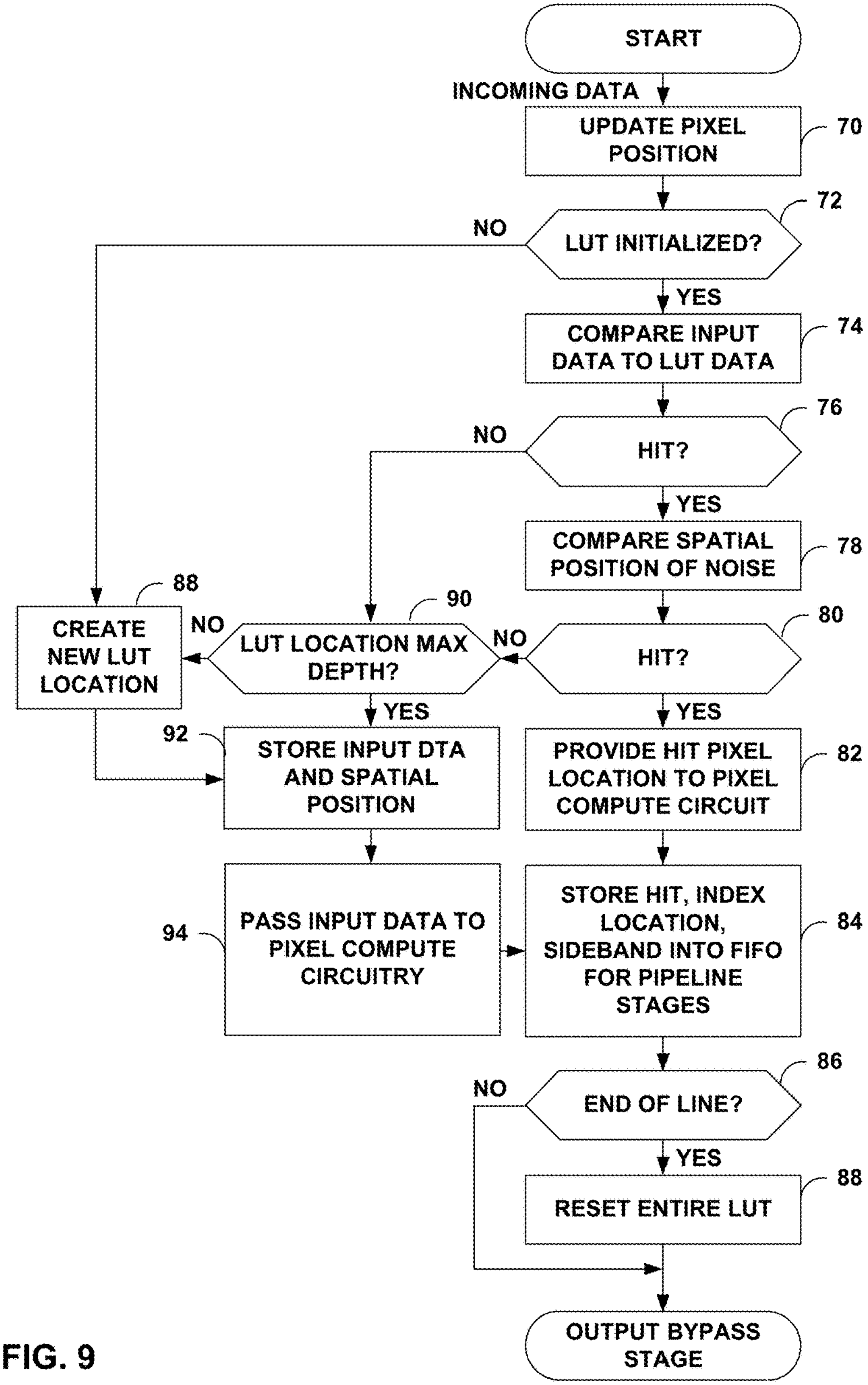
FIG. 9 is a flowchart illustrating an example method of operation in accordance with one or more example techniques described in this disclosure.

FIG. 9 is a flowchart illustrating an example method of operation in accordance with one or more example techniques described in this disclosure. For instance, FIG. 9 illustrates operation of bypass circuit 22 of FIG. 8 in further detail.

As illustrated, bypass circuit 22 may receive incoming color values of a current pixel, and pixel position tracker circuit 26 may update the position based on the position of the current pixel (70). Processing circuit of bypass circuit 22 may determine whether input pixel LUT 36 and/or noise position LUT 32 is initialized (72). If input pixel LUT 36 and/or noise position LUT 32 is not initialized (e.g., because of beginning of new line) (NO of 72), the processing circuit of bypass circuit 22 may create a new LUT location in input pixel LUT 36 and/or noise position LUT 32 (88), and store the input color value and the position in the dither noise matrix, as determined by noise position predictor circuit 30, in respective ones of noise position LUT 32 and input pixel LUT 36 (92). If input pixel LUT 36 and/or noise position LUT 32 is initialized (YES of 72), pixel value comparator circuit 38 may compare input data (e.g., input color value of current pixel) to data in input pixel LUT 36 (74).

Pixel value comparator circuit 38 may determine whether there is a hit or miss (76). For example, pixel value comparator circuit 38 output information indicating whether there was a hit (e.g., input pixel LUT 36 stores color value having same value as current pixel) or miss (e.g., input pixel LUT 36 does not store color value having same value as current pixel).

If there is not a hit (NO of 76), the processing circuit of bypass circuit 22 may determine whether input pixel LUT 36 is at its max depth (90). If the depth of input pixel LUT 36 is reached (YES of 90), then the processing circuit of bypass circuit 22 may store the input color values and the position in the dither noise matrix in local memory 14 (92) for transmitting to pixel compute circuit 24 for processing (94). If the depth of input pixel LUT 36 has not reached (NO of 90), then the processing circuit of bypass circuit 22 may create a new LUT location (88), store the input color values and the position in the dither noise matrix in local memory 14 (92) for transmitting to pixel compute circuit 24 for processing (94).

If there is a hit (YES of 76), noise position comparator circuit 34 may compare the position in the dither noise matrix with positions stored in noise position LUT 32 (78). For example, noise position comparator circuit 34 output information indicating whether there was a hit (e.g., noise position LUT 32 stores position value having same position as the dither value to be applied to the current pixel) or miss (e.g., noise position LUT 32 does not store position value having same value as the dither value to be applied to the current pixel).

If there is not a hit (NO of 80), the processing circuit of bypass circuit 22 may determine whether noise position LUT 32 is at its max depth (90). If the depth of noise position LUT 32 is reached (YES of 90), then the processing circuit of bypass circuit 22 may store the input color values and the position in the dither noise matrix in local memory 14 (92) for transmitting to pixel compute circuit 24 for processing (94). If the depth of noise position LUT 32 has not reached (NO of 90), then the processing circuit of bypass circuit 22 may create a new LUT location (88), store the input color values and the position in the dither noise matrix in local memory 14 (92) for transmitting to pixel compute circuit 24 for processing (94).

If there is a hit (YES of 80), the processing circuit of bypass circuit 22 may provide hit pixel location to one or more pixel compute circuits (82). This operation may be optional. For instance, in examples where there is a plurality of pixel compute circuits, such as described with respect to FIGS. 24-27, the processing circuit of bypass circuit 22 may output information that indicates the position of the pixel where a hit occurred (e.g., bypass was possible) so that the pixel compute circuits can determine the positions for which the pixel compute circuits are not to perform operations. In examples where there is not a plurality of pixel compute circuits, this operation of providing hit pixel location to pixel compute circuits may not be needed.

Output pixel LUT 66 may store output color values as determined by pixel compute circuit 24, and store information of the input color values associated with the output color values and the position (e.g., index) in the dither noise matrix associated with the input color values (84). The position (e.g., index) in the dither noise matrix associated with the input color values indicates the dither value that was applied to the to generate the output color values.

The processing circuit of bypass circuit may determine whether the processing has reached the end of line (86). If not at end of line (NO of 86), the operations may continue to the operations of pixel compute circuit 24, and if at end of line (YES of 86), the processing circuit of bypass circuit 22 may reset noise position LUT 32 (88), and input pixel LUT 36, and the operations may continue to the operations of pixel compute circuit 24.

Figure 10:
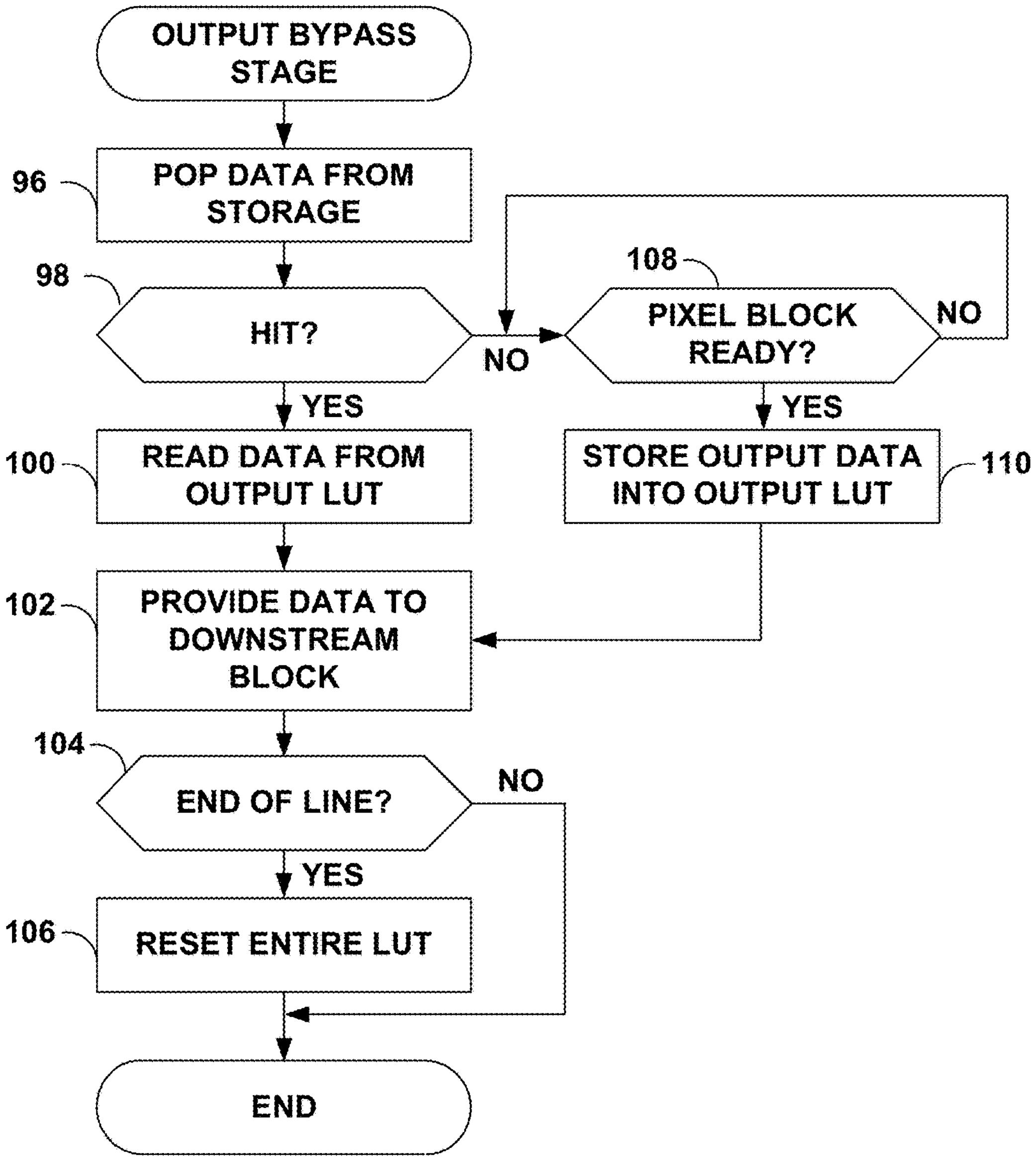
FIG. 10 is another flowchart illustrating an example method of operation in accordance with one or more example techniques described in this disclosure.

FIG. 10 is another flowchart illustrating an example method of operation in accordance with one or more example techniques described in this disclosure. For instance, FIG. 10 illustrates example operations to ensure that the position in the dither noise matrix is correct.

In FIG. 10, in AND gate 40 outputs a logic one, FIFO buffer 42 may pop out the stored pixel position as determined by pixel position tracker circuit 26 (96). MUX 68 may determine whether there was a HIT based on the output from FIFO buffer 42 (98). If there is no hit (NO of 98), MUX 68 may determine whether the pixel processing is complete by pixel compute circuit 24 (e.g., whether output from pipe output circuit 64 is available) (108). If pixel compute circuit 24 has not completed processing of the input pixel (NO of 108), MUX 68 may wait until pixel compute circuit 24 completes processing of the input pixel. MUX 68 may then store the output data from pixel compute circuit 24 (e.g., from pipe output circuit 64) into output pixel LUT 66 (110). MUX 68 may also provide the output pixel value from pipe output circuit 64 to downstream blocks (e.g., other blocks of display processor 16 that receive the output from MUX 68) (102).

If there is a hit (YES of 98), MUX 68 may output pixel value from output pixel LUT 66 (100). Similar to above, MUX 68 may output the pixel value to downstream blocks (e.g., other blocks of display processor 16 that receive the output from MUX 68) (102). Processing circuitry may determine whether the end of line of the image is reached (104). If not at the end of line (NO of 104), the process ends and may continue on to the next pixel. If at the end of line (YES of 104), then the values lookup tables (LUTs) may be reset (106), and the process ends and may continue on to the next line.

Figure 11:
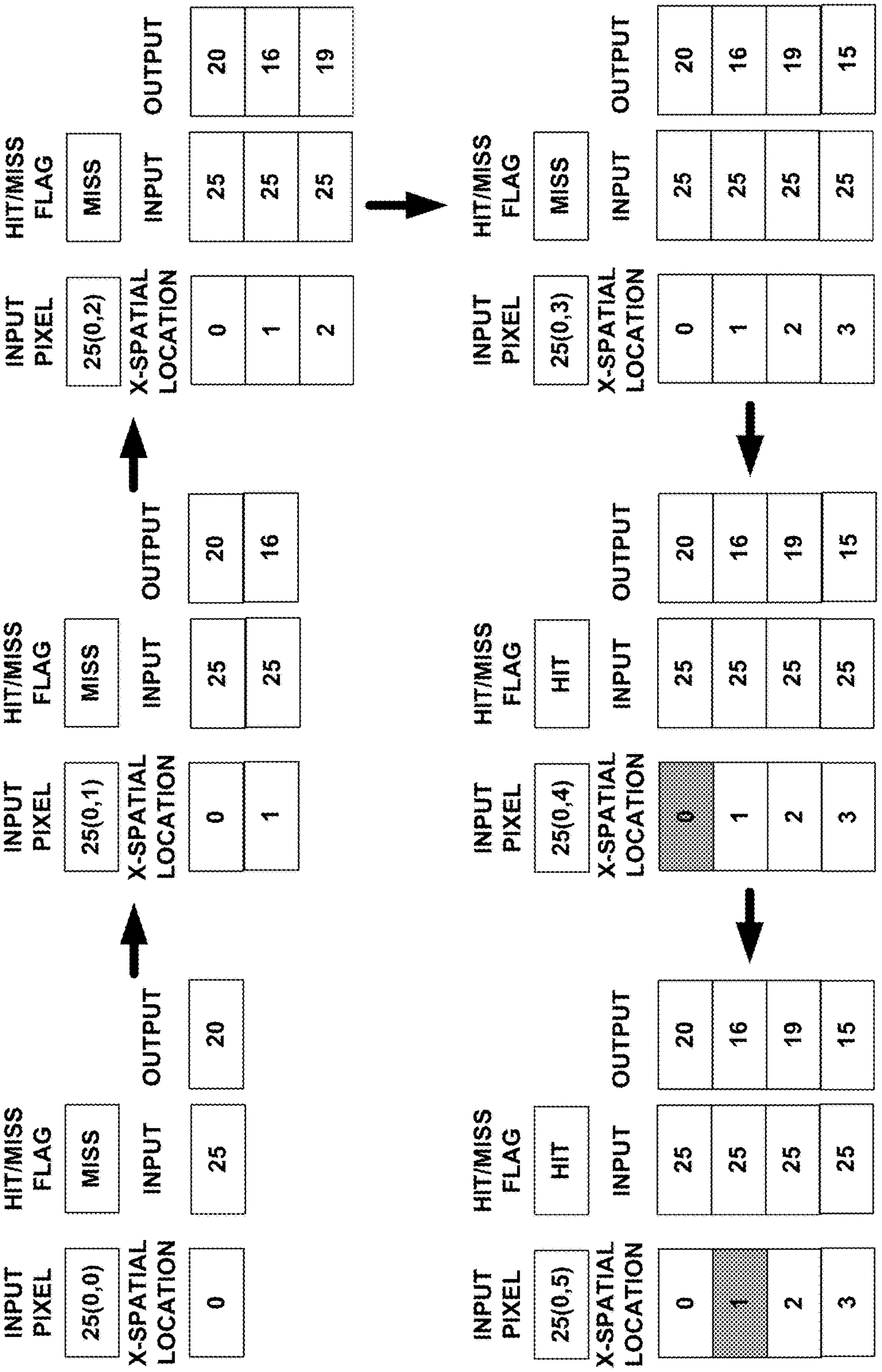
FIG. 11 is a process diagram illustrating an example of determining color values in accordance with one or more example techniques described in this disclosure.

FIG. 11 is a process diagram illustrating an example of determining color values in accordance with one or more example techniques described in this disclosure. In FIG. 11, the dither noise matrix is the same as in FIG. 2 and the input pixel values are same as in FIG. 3.

For instance, for the first pixel at (0, 0), the color value is 25. The dither value that is to be applied is in spatial location 0 in the dither noise matrix. In this example, the input color value and the spatial location 0 have not be processed, there is a miss (e.g., output of AND gate 40 is a logic low). Dither circuit 56 may perform its operations (e.g., those function Y(x,y)) to generate the output value of 20 because the dither value is 15 (e.g., in position 0 in the first line of the dither value matrix).

For the second pixel at (0, 1), the color value is 25. The dither value that is to be applied is in spatial location 1 in the dither noise matrix. In this example, the input color value and the spatial location 1 have not be processed, there is a miss (e.g., output of AND gate 40 is a logic low). Dither circuit 56 may perform its operations (e.g., those function Y(x,y)) to generate the output value of 16 because the dither value is 7 (e.g., in position 1 in the first line of the dither value matrix).

For the third pixel at (0, 2), the color value is 25. The dither value that is to be applied is in spatial location 2 in the dither noise matrix. In this example, the input color value and the spatial location 2 have not be processed, there is a miss (e.g., output of AND gate 40 is a logic low). Dither circuit 56 may perform its operations (e.g., those function Y(x,y)) to generate the output value of 19 because the dither value is 13 (e.g., in position 2 in the first line of the dither value matrix).

For the fourth pixel at (0, 3), the color value is 25. The dither value that is to be applied is in spatial location 3 in the dither noise matrix. In this example, the input color value and the spatial location 3 have not be processed, there is a miss (e.g., output of AND gate 40 is a logic low). Dither circuit 56 may perform its operations (e.g., those function Y(x,y)) to generate the output value of 15 because the dither value is 5 (e.g., in position 3 in the first line of the dither value matrix).

For the fifth pixel at (0, 4), the color value is 25. The dither value that is to be applied is in spatial location 0 in the dither noise matrix. This is because there are only four values in a line of the dither noise matrix, and so the dither noise matrix repeats, as determined by noise repeat calculator circuit 28. In this example, the input color value and the spatial location 0 have be processed, there is a hit (e.g., output of AND gate 40 is a logic high). In this example, rather than dither circuit 56 performing its operations, pixel compute circuit 24 is bypassed, and the output is from output pixel LUT 66.

For the sixth pixel at (0, 5), the color value is 25. The dither value that is to be applied is in spatial location 1 in the dither noise matrix. This is because there are only four values in a line of the dither noise matrix, and so the dither noise matrix repeats, as determined by noise repeat calculator circuit 28. In this example, the input color value and the spatial location 1 have be processed, there is a hit (e.g., output of AND gate 40 is a logic high). In this example, rather than dither circuit 56 performing its operations, pixel compute circuit 24 is bypassed, and the output is from output pixel LUT 66. The process then continues for the line of pixels.

FIG. 11 illustrates an example of performing the dither along an x-axis. However, in some examples, such as in tile-based architecture, the application of dither may be along the x-direction and the y-direction (i.e., 2D spatial comparison). For example, in FIG. 11, pixel compute circuit 24 may compare the x-coordinate in the dither noise matrix to determine whether dither value had been previously applied. However, in tile-based architecture, pixel compute circuit 24 may compare both the x and y-coordinates for 2D spatial comparison.

FIG. 12 is another conceptual diagram illustrating an example of input color values. FIG. 13 is another conceptual diagram illustrating an example of noise values. FIG. 14 is another conceptual diagram illustrating an example of cache hits and misses. FIG. 15 is another conceptual diagram illustrating an example of actual output color values.

FIGS. 12-15 illustrate the operation in accordance with the example techniques described in this disclosure. The input pixels and noise values, illustrated in FIGS. 12 and 13, are same as FIGS. 3 and 4. However, using the techniques described in this disclosure, the cache hits and misses, illustrated in FIG. 14 may be different than those illustrated in FIG. 6. For example, there is cache misses for the first four columns of the input pixels, but cache hits for the last two columns of the input pixels. In this example, although there are fewer cache hits, as compared to FIG. 6, the actual values resulting from the operations, as illustrated in FIG. 15, are the same as the desired values illustrated in FIG. 5, rather than the incorrect values illustrated in FIG. 7.

FIG. 16 is another conceptual diagram illustrating an example of input color values. FIG. 17 is another conceptual diagram illustrating an example of noise values. FIG. 18 is another conceptual diagram illustrating an example of cache hits and misses. FIG. 19 is another conceptual diagram illustrating an example of actual output color values.

The noise values in FIG. 17 are different than those of FIG. 13, but the input values in FIG. 16 are same as those of FIG. 12. For the example noise values in FIG. 17, if the dither noise matrix is considered to be a 4×4 matrix, as illustrated with the highlighting, then cache hit for the existing bypass techniques results in the example illustrated in FIG. 18. FIG. 19 are the actual values from the operations.

FIG. 20 is another conceptual diagram illustrating an example of input color values. FIG. 21 is another conceptual diagram illustrating an example of noise values. FIG. 22 is another conceptual diagram illustrating an example of cache hits and misses. FIG. 23 is another conceptual diagram illustrating an example of actual output color values.

FIGS. 20 and 23 are same as FIGS. 16 and 19. The noise values in FIG. 21 are the same as those in FIG. 17. However, in FIG. 21, the dither noise matrix is considered to be a 2×2 matrix, rather than a 4×4 matrix. For example, if the dither noise matrix were always considered to be a 4×4 matrix (e.g., fixed spatial noise comparison), then the best cache hit/miss result that is possible is illustrated in FIG. 17. However, if the size of the dither noise matrix is dynamically determined (e.g., dynamic spatial noise comparison) based on the repeating pattern (e.g., in FIG. 21, the highlighted 2×2 matrix repeats in the noise values), then it may be possible to achieve better cache hit/miss results. For example, with dynamic noise comparison, the cache hit/miss results are illustrated in FIG. 22. As illustrated, there is a cache miss for the first two columns, but then a cache hit for the last four columns, meaning that fewer pixels need to be processed by pixel compute circuit 24, resulting in even better power savings.

As described with respect to FIGS. 16-19 and 20-23, it may be possible to adjust the dither noise matrix to exploit redundancies. For instance, rather than using a 4×4 dither noise matrix, it may be possible to use a 2×2 dither noise matrix if the matrix repeats for every 2×2 block of dither values. In this case, the number of hits achieved may increase 10-25% relative to the fixed, unadjusted dither noise matrix.

Figure 24:
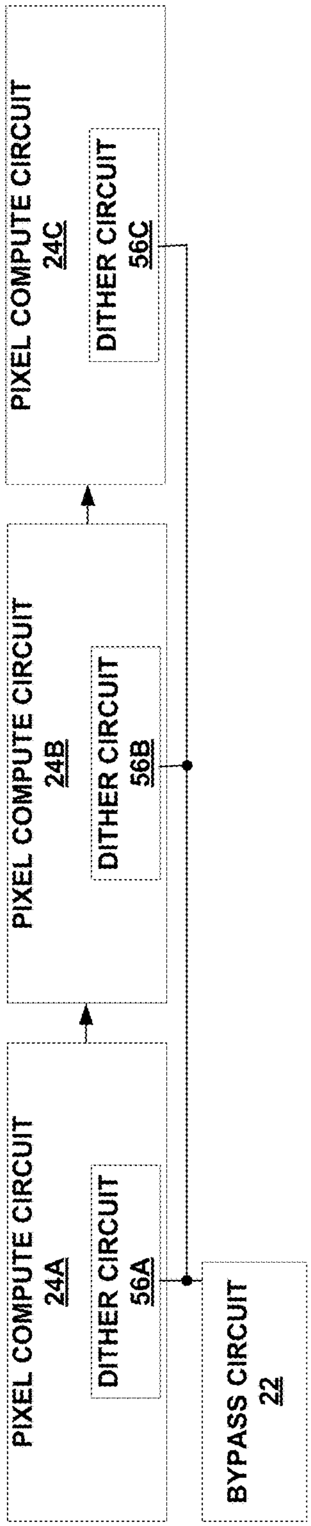
FIG. 24 is a block diagram illustrating a plurality of pixel compute circuits coupled together with broadcasting of pixel position.

FIG. 24 is a block diagram illustrating a plurality of pixel compute circuits coupled together with broadcasting of pixel position. As described above, in some examples, pixel compute circuit 24 of FIG. 8 may be one of a plurality of pixel compute circuits. For example, FIG. 24 illustrates a plurality of pixel compute circuits 24A-24C, which may all be similar to pixel compute circuit 24. Each one pixel compute circuits 24A-24C includes a respective one of dither circuit 56A-56C. Each of pixel compute circuits 24A-24C may be configured to perform different pixel processing such as gamut correction, color correction, and the other operations that display processor 16 is to perform.

As described above, in some examples, bypass circuit 22 may provide output to the plurality of pixel compute circuits 24A-24C to indicate pixel position of a pixel that respective ones of pixel compute circuits 24A-24C are not to process. FIG. 24 illustrates a broadcast approach, where bypass circuit 22 broadcasts the pixel position of a pixel for which pixel compute circuits 24A-24C are not to process.

Figure 25:
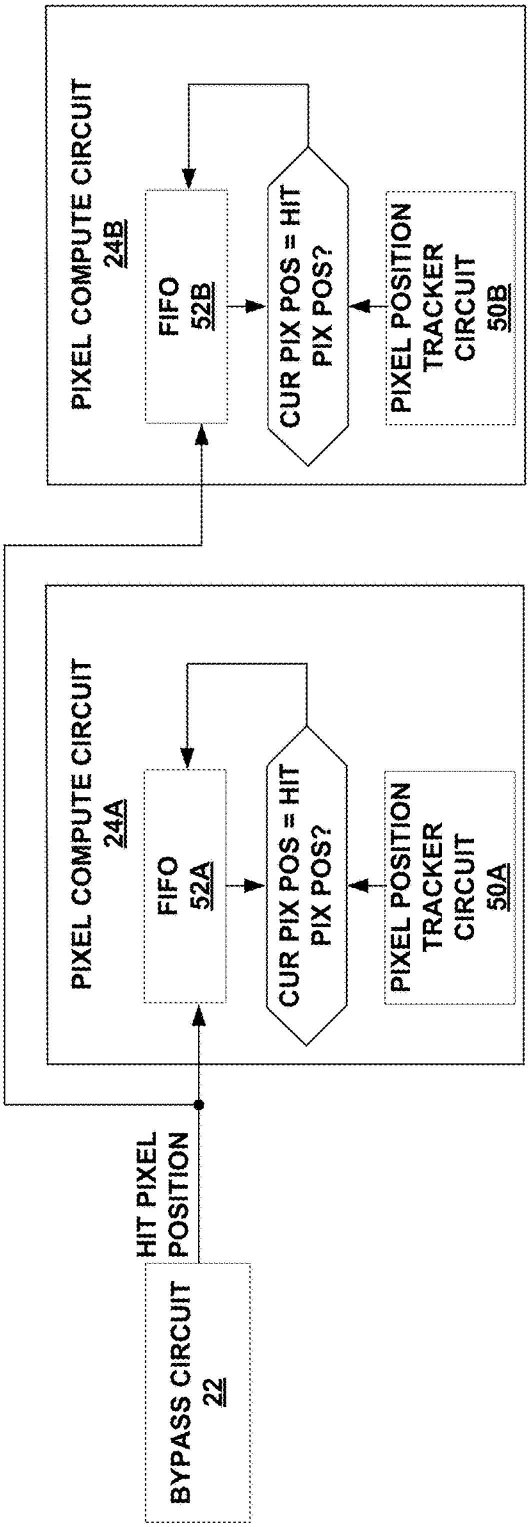
FIG. 25 is a block diagram illustrating respective dither circuits receiving broadcasted pixel position.

FIG. 25 is a block diagram illustrating respective dither circuits receiving broadcasted pixel position. For instance, FIG. 25 illustrates pixel compute circuit 24A that includes FIFO buffer 52A, which is similar to FIFO buffer 52 of FIG. 8, and pixel position tracker circuit 50A, which is similar to pixel position tracker circuit 50 of FIG. 8. FIG. 25 also illustrates pixel compute circuit 24B that includes FIFO buffer 52A, which is similar to FIFO buffer 52 of FIG. 8, and pixel position tracker circuit 50A, which is similar to pixel position tracker circuit 50 of FIG. 8.

As illustrated, bypass circuit 22 outputs the hit pixel position (e.g., pixel position for which pixel compute circuits 24A-24C are not to process) to both pixel compute circuit 24A and 24B. FIFO buffers 52A and 52B store the hit pixel position, and pixel position tracker circuits 50A and 50B count the number of pixels that are processed. When the pixel count equals the hit position (e.g., as determined by pixel position comparator circuits similar to pixel position comparator circuit 54 of FIG. 8), pixel compute circuits 24A and 24B increment the position in the dither noise matrix, and pop the entry from FIFO buffers 52A and 52B. In some examples, the size (e.g., depth) of FIFO buffers 52A and 52B may be greater than or equal to the pipeline stage of previous stages (e.g., 12X pipeline depth).

Accordingly, FIGS. 24 and 25 illustrate an example where bypass circuit 22 broadcasts a position of a pixel that pixel compute circuits 24A-24C are not to process. One or more of pixel compute circuits 24A-24C update a position in a dither noise matrix indicative of dither values to be applied based on the broadcasted position of the pixel.

Figure 26:
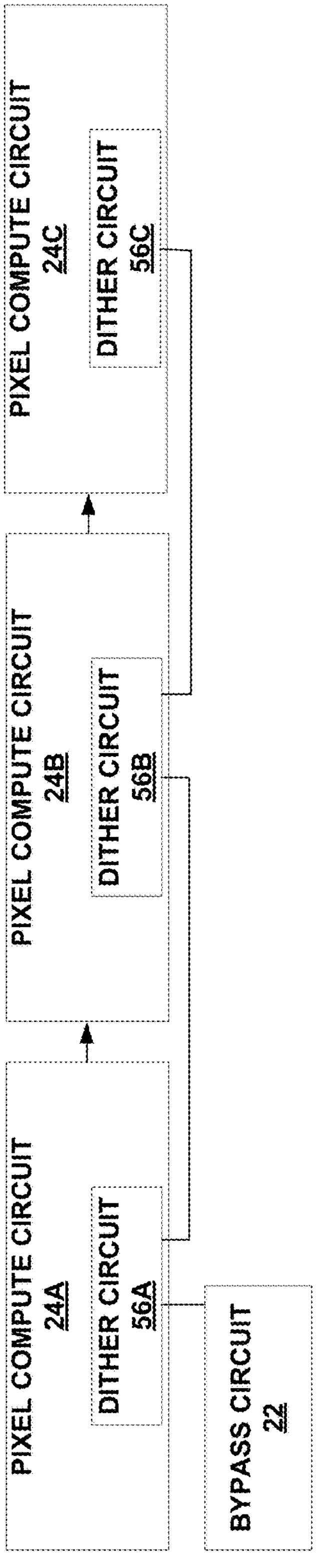
FIG. 26 is a block diagram illustrating a plurality of pixel compute circuit coupled sequentially with sequential transmission of pixel position.

FIG. 26 is a block diagram illustrating a plurality of pixel compute circuit coupled sequentially with sequential transmission of pixel position. FIG. 26 is similar to FIG. 24, but rather than using a broadcast approach, each one of pixel compute circuits 24A-24C may output the hit pixel position to the next one of pixel compute circuits 24A-24C.

Figure 27:
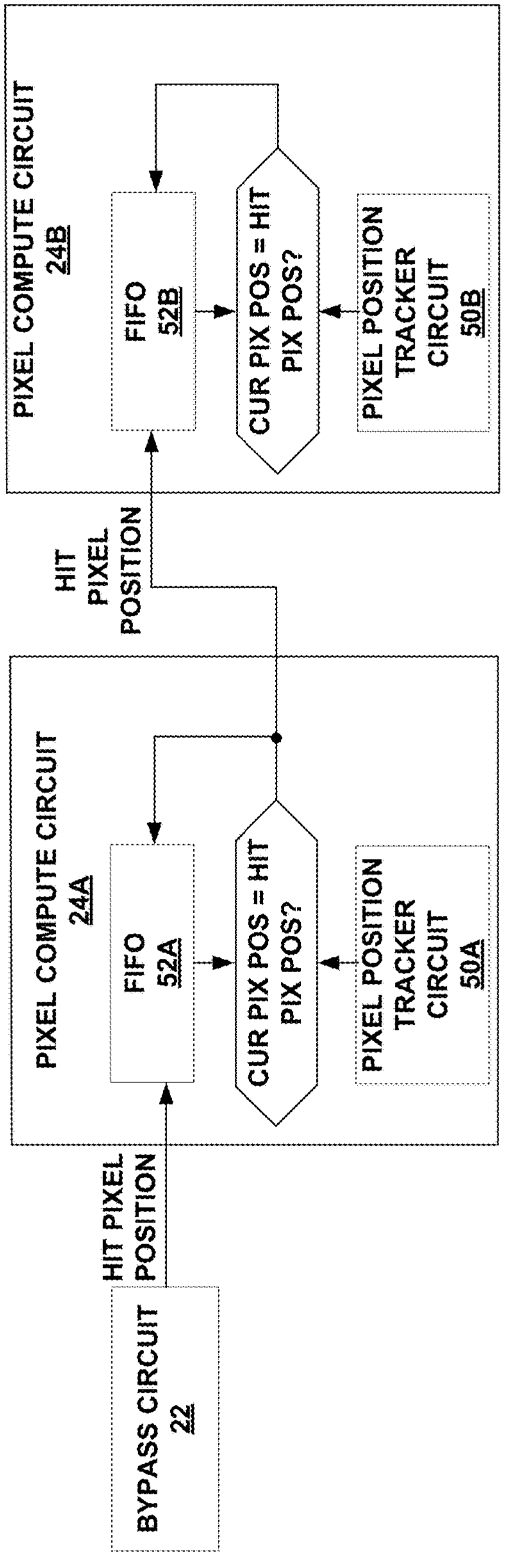
FIG. 27 is a block diagram illustrating respective dither circuits receiving sequentially transmitted pixel position.

FIG. 27 is a block diagram illustrating respective dither circuits receiving sequentially transmitted pixel position. As illustrated in FIG. 27, bypass circuit 22 outputs the hit pixel position to pixel compute circuit 24A. Pixel compute circuit 24A updates FIFO buffer 52A, and when the pixel count equals the hit position (e.g., as determined by pixel position comparator circuits similar to pixel position comparator circuit 54 of FIG. 8), pixel compute circuit 24A increments the position in the dither noise matrix, and pops the entry from FIFO buffer 52A.

After updating the dither noise matrix, pixel compute circuit 24A outputs the hit pixel position to pixel compute circuit 24B, which performs similar operations with FIFO buffer 52B and pixel position tracker circuit 50B. In this example, the size (e.g., depth) of FIFO buffers 52A and 52B may be reduced relative to the broadcast approach by chaining the hit pixel position.

FIGS. 26 and 27 illustrate an example where bypass circuit 22 is configured to output a position of a pixel to one of pixel compute circuits 24A-24C. One or more of pixel compute circuits 24A-24C is configured to output the position of the pixel to respective subsequent pixel compute circuits 24A-24C. Each of pixel compute circuits 24A-24C is configured to not process the pixel. Also, one or more of pixel compute circuits 24A-24C is configured to update a position in a dither noise matrix indicative of dither values to be applied based on the outputted position of the pixel.

Also, the above describes examples of using broadcast and sequential transmitting of hit pixel position. In some examples, it may be possible to remove FIFO buffers 52A-52C if a "bubble" created at input of pixel compute circuit 24 due to gating by AND gate 46 to the input dither circuit 56. However, for this to operate, there may not be any breaking of the pipeline stage pixel compute circuit 24.

Figure 28:
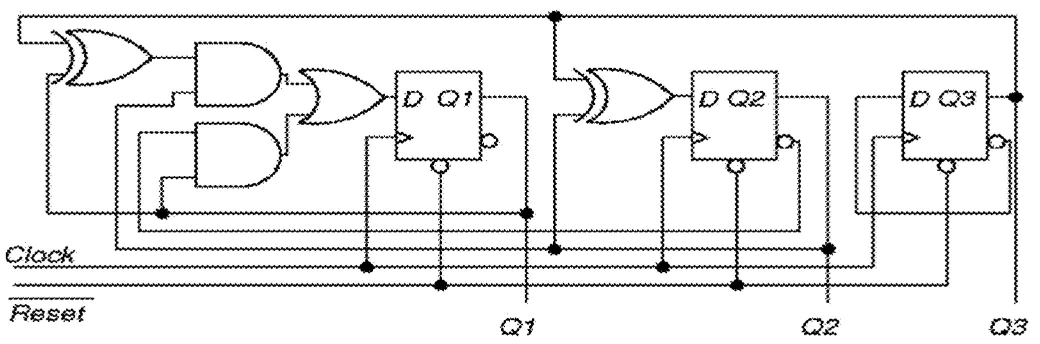
FIG. 28 is a block diagram illustrating a repetitive noise source.

FIG. 28 is a block diagram illustrating a repetitive noise source. For example, although the example techniques are described with dither noise matrix such as illustrated in FIG. 2, the techniques are applicable to other noise sources. FIG. 28 illustrates one such noise source that may be produced repetitive noise.

Figure 29:
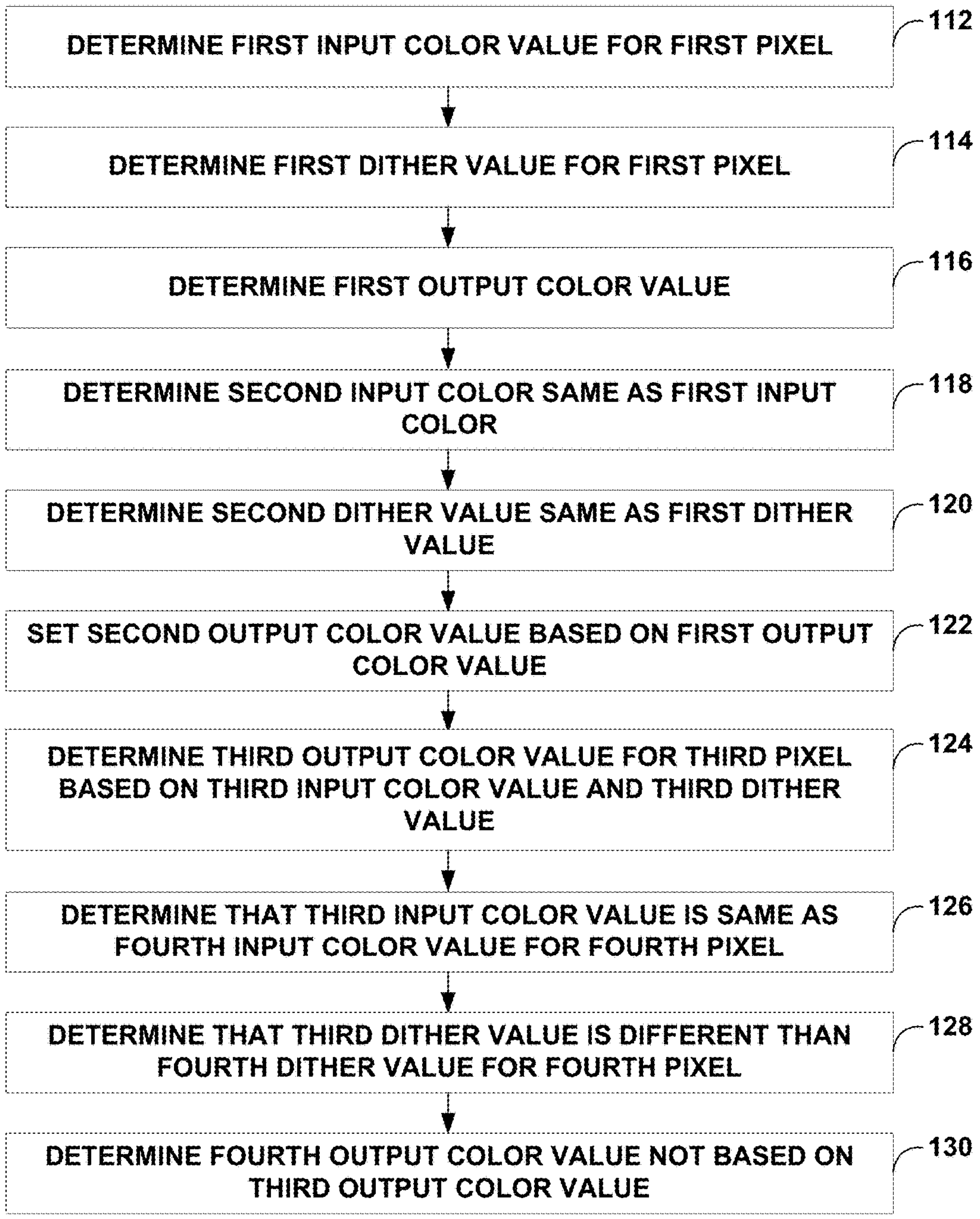
FIG. 29 is another flowchart illustrating an example method of operation in accordance with one or more example techniques described in this disclosure.

FIG. 29 is another flowchart illustrating an example method of operation in accordance with one or more example techniques described in this disclosure. For ease, the example techniques are described with respect to a first, second, third, and fourth pixel. Assume that the first pixel is pixel that needs to be process by pixel compute circuit 24.

For example, pixel compute circuit 24 may determine a first input color value for a first pixel (112). Pixel compute circuit 24 may also determine a first dither value for the first pixel (114). For example, the first input color value may be the input color value that pixel compute circuit 24 receives or the output of pixel processing circuit 48 (FIG. 8). One example way in which pixel compute circuit 24 may determine the first dither value for the first pixel is based on the position of the first pixel in a line of pixels and the size of a dither noise matrix. Based on position of the first pixel and the size of the dither noise matrix, pixel compute circuit 24 (e.g., noise source position circuit 62 of FIG. 8) may determine a position in the dither noise matrix. Noise source generator circuit 60 may determine the dither value associated with the determined position.

Pixel compute circuit 24 may determine a first output value for the first pixel based on the first input color value and the first dither value (116). For example, dither circuit 56 performs the dither operation (e.g., Y(x,y)) to generate the first output value.

Then, for a second pixel, bypass circuit 22 may determine that a second input color value for a second pixel is same as the first input color value based on a comparison of the first input color value and the second input color value (118). For example, based on input pixel LUT 36, pixel value comparator circuit 38 may determine that the second input color value for the second pixel is same as the first input color value.

Bypass circuit 22 may also determine that a second dither value for the second pixel is the same as the first dither value (120). One way for bypass circuit 22 to make this determination is based on the position of the first dither value in the dither noise matrix and the position of the second dither value in the dither noise matrix. If the positions of the first and second dither values is the same, bypass circuit 22 (e.g., via noise position LUT 32 and noise position comparator circuit 34) may determine that the second dither value for the second pixel is the same as the first dither value.

In this example, display processor 16 may set a second output color value for the second pixel based on the first output color value for the first pixel (122). For instance, output pixel LUT 66 may output the output pixel value for the first pixel as the output pixel value for the second pixel.

Similar to the first pixel, pixel compute circuit 24 may determine a third output color value for a third pixel based on a third input color value and a third dither value (124). In this example, bypass circuit 22 (e.g., via input pixel LUT 36 and pixel value comparator circuit 38) may determine that the third input color value for the third pixel is same as the fourth input color value for the fourth pixel (126). However, bypass circuit 22 (e.g., via noise position LUT 32 and noise position comparator circuit 34) may determine that the third dither value for the third pixel is different than a fourth dither value for the fourth pixel (e.g., because the position in the dither noise matrix is different) (128). In this case, even though the input color values for the third and fourth pixels is the same, pixel compute circuit 24 may determine a fourth output color value for the fourth pixel based on the fourth input color value and the fourth dither value (130). The fourth output color value is not determined based on the third output color value, and the third output color value is not determined based on the fourth output color value.

The following describes some potential advantages that may be realized using the example techniques described in this disclosure. Such advantages are not always necessary, but assist in understanding the techniques.

The example techniques may provide approximately 25-70% power saving such as by reducing the power by 30-92 mW. The additional circuitry for bypass circuit 22 may be relatively minimal (e.g., approximately 2% of pixel compute circuit 24).

As some examples of power savings relative to examples that do not use bypass circuit, for user interface applications, the power savings were approximately 72%. For camera preview, the power savings were approximately 37%. For video playback, the power savings were approximately 50%. For gaming, the power savings were approximately 42%. For 10-bit graphics, the power saving was approximately 25%.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of generating image content, the method comprising:

determining a first input color value for a first pixel;

determining a first dither value for the first pixel;

determining a first output color value for the first pixel based on the first input color value and the first dither value, wherein determining the first output color value comprises determining the first output color value with a pixel compute circuit that performs post-graphics processing on the first input color value;

determining that a second input color value for a second pixel is same as the first input color value based on a comparison of the first input color value and the second input color value;

determining that a second dither value for the second pixel is the same as the first dither value; and setting a second output color value for the second pixel based on the first output color value for the first pixel, wherein setting the second output color value comprises setting the second output color value via a bypass circuit that is different than the pixel compute circuit and does not perform post-graphics processing on the second input color value.

2. The method of claim 1, further comprising:

determining a third output color value for a third pixel based on a third input color value and a third dither value;

determining that the third input color value for the third pixel is same as a fourth input color value for a fourth pixel;

determining that the third dither value for the third pixel is different than a fourth dither value for the fourth pixel; and determining a fourth output color value for the fourth pixel based on the fourth input color value and the fourth dither value, wherein the fourth output color value is not determined based on the third output color value, and the third output color value is not determined based on the fourth output color value.

3. The method of claim 1, wherein setting the second output color value comprises setting the second output color value for the second pixel based on the first output color value for the first pixel without using the second dither value to determine the second output color value.

4. The method of claim 1, wherein determining the first dither value for the first pixel comprises determining a first position in a dither noise matrix based on a position of the first pixel in a line of pixels, the method further comprising:

determining a second position in the dither noise matrix based on a position of the second pixel in the same line of pixels, wherein determining that the second dither value for the second pixel is the same as the first dither value comprises determining that the second position in the dither noise matrix is the same as the first position in the dither noise matrix.

5. The method of claim 1, further comprising:

storing information indicative of the first input color value and a position in a dither noise matrix for the first pixel, wherein the position in the dither noise matrix for the first pixel includes the first dither value; and determining a position in the dither noise matrix for the second pixel, wherein determining the second input color value is the same as the first input color value comprises determining that the second input color value is equal to the first input color value based on the stored information, wherein determining that the second dither value for the second pixel is the same as the first dither value comprises determining that the position in the dither noise matrix for the second pixel is equal to the position in the dither noise matrix for the first pixel based on the stored information, and wherein setting the second output color value for the second pixel based on the first output color value for the first pixel comprises setting the second output color value equal to the first output color value based on the second input color value for the second pixel being equal to the first input color value for the first pixel, and the position in the dither noise matrix for the second pixel being equal to the position in the same dither noise matrix for the first pixel.

6. The method of claim 1, further comprising:

broadcasting a position of the second pixel to a plurality of pixel compute circuits, wherein one or more of the plurality of pixel compute circuits is configured to not process the second pixel; and updating a position in a dither noise matrix indicative of dither values to be applied based on the broadcasted position of the second pixel.

7. The method of claim 1, further comprising:

outputting a position of the second pixel to a subsequent pixel compute circuit of a plurality of pixel compute circuits, wherein one or more of the plurality of pixel compute circuits is configured to output the position of the second pixel to respective subsequent pixel compute circuits, and wherein each of the plurality of pixel compute circuits is configured to not process the second pixel; and updating a position in a dither noise matrix indicative of dither values to be applied based on the outputted position of the second pixel.

8. A device for generating image content, the device comprising:

a pixel compute circuit configured to:

determine a first input color value for a first pixel;

determine a first dither value for the first pixel; and determine a first output color value for the first pixel based on the first input color value and the first dither value, wherein the pixel compute circuit is configured to perform post-graphics processing on the first input color value to determine the first output color value; and a bypass circuit configured to:

determine that a second input color value for a second pixel is same as the first input color value based on a comparison of the first input color value and the second input color value;

determine that a second dither value for the second pixel is the same as the first dither value; and set a second output color value for the second pixel based on the first output color value for the first pixel, wherein the bypass circuit is configured to set the second output color value without performing post-graphics processing on the second input color value.

9. The device of claim 8, wherein the pixel compute circuit is configured to determine a third output color value for a third pixel based on a third input color value and a third dither value, wherein the bypass circuit is configured to determine that the third input color value for the third pixel is same as a fourth input color value for a fourth pixel, wherein the bypass circuit is configured to determine that the third dither value for the third pixel is different than a fourth dither value for the fourth pixel, and wherein the pixel compute circuit is configured to determine a fourth output color value for the fourth pixel based on the fourth input color value and the fourth dither value, wherein the fourth output color value is not determined based on the third output color value, and the third output color value is not determined based on the fourth output color value.

10. The device of claim 8, wherein to set the second output color value, the bypass circuit is configured to set the second output color value for the second pixel based on the first output color value for the first pixel without using the second dither value to determine the second output color value.

11. The device of claim 8, wherein to determine the first dither value for the first pixel, the pixel compute circuit is configured to determine a first position in a dither noise matrix based on a position of the first pixel in a line of pixels, wherein the bypass circuit is configured to determine a second position in the dither noise matrix based on a position of the second pixel in the same line of pixels, and wherein to determine that the second dither value for the second pixel is the same as the first dither value, the bypass circuit is configured to determine that the second position in the dither noise matrix is the same as the first position in the dither noise matrix.

12. The device of claim 8, further comprising:

one or more look-up tables (LUTs) configured to store information indicative of the first input color value and a position in a dither noise matrix for the first pixel, wherein the position in the dither noise matrix for the first pixel includes the first dither value, wherein the bypass circuit is configured to determine a position in the dither noise matrix for the second pixel, wherein to determine the second input color value is the same as the first input color value, the bypass circuit is configured to determine that the second input color value is equal to the first input color value based on the stored information, wherein to determine that the second dither value for the second pixel is the same as the first dither value, the bypass circuit is configured to determine that the position in the dither noise matrix for the second pixel is equal to the position in the dither noise matrix for the first pixel based on the stored information, and wherein to set the second output color value for the second pixel based on the first output color value for the first pixel, the bypass circuit is configured to set the second output color value equal to the first output color value based on the second input color value for the second pixel being equal to the first input color value for the first pixel, and the position in the dither noise matrix for the second pixel being equal to the position in the dither noise matrix for the first pixel.

13. The device of claim 8, further comprising:

a plurality of pixel compute circuits, wherein the bypass circuit is configured to broadcast a position of the second pixel to a plurality of pixel compute circuits, wherein one or more of the plurality of pixel compute circuits is configured to not process the second pixel, and wherein one or more of the plurality of pixel compute circuits are configured to update a position in a dither noise matrix indicative of dither values to be applied based on the broadcasted position of the second pixel.

14. The device of claim 8, further comprising:

a plurality of pixel compute circuits, wherein the bypass circuit is configured to output a position of the second pixel to one of the pixel compute circuits, and one or more of the pixel compute circuits is configured to output the position of the second pixel to respective subsequent pixel compute circuits of the plurality of pixel compute circuits, and wherein each of the plurality of pixel compute circuits is configured to not process the second pixel, and wherein one or more of the pixel compute circuits is configured to update a position in a dither noise matrix indicative of dither values to be applied based on the outputted position of the second pixel.

15. The device of claim 8, wherein the device comprises one of:

a microprocessor;

an integrated circuit; or a wireless communication device.

16. A computer-readable storage medium storing instructions that when executed cause one or more processors of a device for generating image content to:

determine a first input color value for a first pixel;

determine a first dither value for the first pixel;

determine a first output color value for the first pixel based on the first input color value and the first dither value, wherein the instructions that cause the one or more processors to determine the first output color value comprise instructions that cause the one or more processors to determine the first output color value with a pixel compute circuit that performs post-graphics processing on the first input color value;

determine that a second input color value for a second pixel is same as the first input color value based on a comparison of the first input color value and the second input color value;

determine that a second dither value for the second pixel is the same as the first dither value; and set a second output color value for the second pixel based on the first output color value for the first pixel, wherein the instructions that cause the one or more processors to set the second output color value comprise instructions that cause the one or more processors to set the second output color value via a bypass circuit that is different than the pixel compute circuit and does not perform post-graphics processing on the second input color value.

17. The computer-readable storage medium of claim 16, further comprising instructions that cause the one or more processors to:

determine a third output color value for a third pixel based on a third input color value and a third dither value;

determine that the third input color value for the third pixel is same as a fourth input color value for a fourth pixel;

determine that the third dither value for the third pixel is different than a fourth dither value for the fourth pixel; and determine a fourth output color value for the fourth pixel based on the fourth input color value and the fourth dither value, wherein the fourth output color value is not determined based on the third output color value, and the third output color value is not determined based on the fourth output color value.

18. The computer-readable storage medium of claim 16, wherein the instructions that cause the one or more processors to set the second output color value comprise instructions that cause the one or more processors to set the second output color value for the second pixel based on the first output color value for the first pixel without using the second dither value to determine the second output color value.

19. The computer-readable storage medium of claim 16, wherein the instructions that cause the one or more processors to determine the first dither value for the first pixel comprise instructions that cause the one or more processors to determine a first position in a dither noise matrix based on a position of the first pixel in a line of pixels, the instruction further comprising instructions that cause the one or more processors to:

determine a second position in the dither noise matrix based on a position of the second pixel in the same line of pixels, wherein the instructions that cause the one or more processors to determine that the second dither value for the second pixel is the same as the first dither value comprise instructions that cause the one or more processors to determine that the second position in the dither noise matrix is the same as the first position in the dither noise matrix.

20. The computer-readable storage medium of claim 16, further comprising instructions that cause the one or more processors to:

broadcast a position of the second pixel to a plurality of pixel compute circuits, wherein one or more of the plurality of pixel compute circuits is configured to not process the second pixel; and update a position in a dither noise matrix indicative of dither values to be applied based on the broadcasted position of the second pixel.

21. The computer-readable storage medium of claim 16, further comprising instructions that cause the one or more processors to:

output a position of the second pixel to a subsequent pixel compute circuit of a plurality of pixel compute circuits, wherein one or more of the plurality of pixel compute circuits is configured to output the position of the second pixel to respective subsequent pixel compute circuits, and wherein each of the plurality of pixel compute circuits is configured to not process the second pixel; and update a position in a dither noise matrix indicative of dither values to be applied based on the outputted position of the second pixel.

22. A device of generating image content, the device comprising:

means for determining a first input color value for a first pixel;

means for determining a first dither value for the first pixel;

means for determining a first output color value for the first pixel based on the first input color value and the first dither value;

means for determining that a second input color value for a second pixel is same as the first input color value based on a comparison of the first input color value and the second input color value;

means for determining that a second dither value for the second pixel is the same as the first dither value; and means for setting a second output color value for the second pixel based on the first output color value for the first pixel, wherein the device further comprises a pixel compute circuit configured to perform post-graphics processing, and a bypass circuit that is different than the pixel compute circuit and does not perform post-graphics processing, wherein the pixel compute circuit comprises the means for determining the first output color value, and wherein the bypass circuit comprises the means for setting the second output color value.

23. The device of claim 22, further comprising:

means for determining a third output color value for a third pixel based on a third input color value and a third dither value;

means for determining that the third input color value for the third pixel is same as a fourth input color value for a fourth pixel;

means for determining that the third dither value for the third pixel is different than a fourth dither value for the fourth pixel; and means for determining a fourth output color value for the fourth pixel based on the fourth input color value and the fourth dither value, wherein the fourth output color value is not determined based on the third output color value, and the third output color value is not determined based on the fourth output color value.

24. The device of claim 22, wherein the means for determining the first dither value for the first pixel comprises means for determining a first position in a dither noise matrix based on a position of the first pixel in a line of pixels, the device further comprising:

means for determining a second position in the dither noise matrix based on a position of the second pixel in the same line of pixels, wherein the means for determining that the second dither value for the second pixel is the same as the first dither value comprises means for determining that the second position in the dither noise matrix is the same as the first position in the dither noise matrix.

25. The device of claim 22, further comprising:

means for storing information indicative of the first input color value and a position in a dither noise matrix for the first pixel, wherein the position in the dither noise matrix for the first pixel includes the first dither value; and means for determining a position in the dither noise matrix for the second pixel, wherein the means for determining the second input color value is the same as the first input color value comprises means for determining that the second input color value is equal to the first input color value based on the stored information, wherein the means for determining that the second dither value for the second pixel is the same as the first dither value comprises means for determining that the position in the dither noise matrix for the second pixel is equal to the position in the dither noise matrix for the first pixel based on the stored information, and wherein the means for setting the second output color value for the second pixel based on the first output color value for the first pixel comprises means for setting the second output color value equal to the first output color value based on the second input color value for the second pixel being equal to the first input color value for the first pixel, and the position in the dither noise matrix for the second pixel being equal to the position in the same dither noise matrix for the first pixel.

* * * * *